United States Patent
Otsuka et al.

(10) Patent No.: US 8,572,965 B2
(45) Date of Patent: Nov. 5, 2013

(54) HIGH-TEMPERATURE RADIATOR STORAGE YARD GENERATING APPARATUS

(75) Inventors: Hiroyuki Otsuka, Yokohama (JP);
Hisakazu Onizuka, Yokohama (JP);
Shinsuke Matsuno, Yokohama (JP);
Takahisa Nagao, Yokohama (JP);
Yoshiyuki Yamane, Tokyo (JP); Atsushi Hirata, Hiratsuka (JP); Kazuo Miyoshi, Tokyo (JP); Masahiro Nakajima, Tokyo (JP)

(73) Assignee: IHI Corporation (JP)

( * ) Notice: Subject to any disclaimer, the term of this patent is extended or adjusted under 35 U.S.C. 154(b) by 482 days.

(21) Appl. No.: 12/866,390

(22) PCT Filed: Feb. 6, 2009

(86) PCT No.: PCT/JP2009/052093
§ 371 (c)(1),
(2), (4) Date: Aug. 5, 2010

(87) PCT Pub. No.: WO2009/099206
PCT Pub. Date: Aug. 13, 2009

(65) Prior Publication Data
US 2010/0314879 A1 Dec. 16, 2010

(30) Foreign Application Priority Data

Feb. 6, 2008 (JP) ................ P2008-26720
Dec. 16, 2008 (JP) ............... P2008-320242
Dec. 19, 2008 (JP) ............... P2008-323231
Dec. 26, 2008 (JP) ............... P2008-332066

(51) Int. Cl.
*F03G 6/00* (2006.01)

(52) U.S. Cl.
USPC .......... 60/641.11; 60/650; 60/659; 60/641.12

(58) Field of Classification Search
USPC .......... 60/650, 641.11, 641.12, 641.1, 641.6, 60/659; 290/52, 55; 126/645
See application file for complete search history.

(56) References Cited

FOREIGN PATENT DOCUMENTS

| CN | 2413050 | 1/2001 |
|---|---|---|
| CN | 1405448 | 3/2003 |

(Continued)

OTHER PUBLICATIONS

Decision on Grant dated Feb. 28, 2012 issued in corresponding Russian Patent Application No. 2010136041 with English translation (14 pages).

(Continued)

*Primary Examiner* — Kenneth Bomberg
*Assistant Examiner* — Kelsey Stanek
(74) *Attorney, Agent, or Firm* — Ostrolenk Faber LLP

(57) ABSTRACT

A chimney has a lower portion substantially in the shape of a pyramid and an upper portion forming a cylindrical portion that extends with a predetermined dimension upwardly and is provided in a ceiling portion of a building of a coil yard that is used for temporary storage of the hot-rolled coil which is an intermediate iron and steel product acting as a high-temperature heat radiator that is manufactured using the hot-rolling equipment of an iron and steel mill. A power generating turbine is provided at a predetermined position in the cylindrical portion. An intake duct is provided on a lower end portion of the side walls of the building. Hot-rolled coils that are in a high-temperature condition after manufacture are successively imported into the coil yard and accumulated and stored until transfer to a subsequent processing step. An ascending airflow is generated by sequential heating of air introduced into the building from the intake duct using heat retained in the hot-rolled coils. The power generating turbines are rotated by the ascending airflow passing through the cylindrical portion of the chimney to thereby execute wind power generation. As a result, the heat retained in the high-temperature heat radiator manufactured by introduction of heat can be efficiently used.

16 Claims, 17 Drawing Sheets

(56) References Cited

FOREIGN PATENT DOCUMENTS

| | | | |
|---|---|---|---|
| CN | 2653164 | | 11/2004 |
| DE | 100 23 424 | A1 | 11/2001 |
| FR | 2 461 832 | | 2/1981 |
| JP | 57-134207 | | 8/1982 |
| JP | 57134207 | * | 8/1982 |
| JP | 61-85588 | * | 5/1986 |
| JP | 63-216927 | * | 9/1988 |
| JP | 5-280462 | | 10/1993 |
| JP | 10-296319 | * | 11/1998 |
| JP | 11-118226 | * | 4/1999 |
| JP | 2002-276531 | | 9/2002 |
| JP | 2002-276540 | * | 9/2002 |
| JP | 2003-120506 | * | 4/2003 |
| JP | 2006-36411 | * | 2/2006 |
| JP | 2006-77676 | | 3/2006 |
| JP | 2007-77941 | | 3/2007 |
| RU | 2 013 655 | | 5/1994 |
| RU | 2 037 101 | | 6/1995 |
| RU | 2 265 161 | | 4/2004 |
| RU | 2 265 161 | | 11/2005 |
| TW | M242587 | | 9/2004 |
| WO | WO 2005/103581 | | 11/2005 |

OTHER PUBLICATIONS

Examination Report dated Apr. 16, 2012 issued in corresponding Taiwan Patent Application No. 098103805 with English translation (13 pages).
Supplementary European Search Report dated Aug. 17, 2012 issued in corresponding European Patent Application No. 09707803.4 (7 pages).
Petrorius, et al., "Sensitivity Analysis of the Operating and Technical Specifications of a Solar Chimney Power Plant", Journal of Solar-Energy Engineering, vol. 129, May 2007, pp. 171-178.
Petrorius, et al., "Solar Chimney Power Plant Performance", Journal of Solar Energy Engineenng, vol. 128, Aug. 2006, pp. 302-311.
International Search Report and Written Opinion mailed Apr. 28, 2009 in corresponding PCT International Application No. PCT/JP2009/052093.
Office Action issued by the Chinese Patent Office on Sep. 29, 2012 in connection With corresponding Chinese Patent Application No. 200980111896.8.
Translation of the Office Action issued by the Chinese Patent Office on Sep. 29, 2012 in connection with corresponding Chinese Patent Application No. 200980111896.8.

* cited by examiner

HIGH-TEMPERATURE RADIATOR STORAGE YARD GENERATING APPARATUS

CROSS-REFERENCE TO RELATED APPLICATIONS

The present application is a 35 U.S.C. §§371 national phase conversion of PCT/JP2009/052093, filed Feb. 6, 2009, which claims priority of Japanese Patent Application No. 2008-26720, filed Feb. 6, 2008, Japanese Patent Application No. 2008-320242, filed Dec. 16, 2008, Japanese Patent Application No. 2008-323231, filed Dec. 19, 2008, and Japanese Patent Application No. 2008-332066, filed Dec. 26, 2008, the contents of which are incorporated herein by reference. The PCT International Application was published in the Japanese language.

1. Technical Field

The present invention relates a high-temperature radiator storage yard generating apparatus that is configured to enable efficient recovery of heat retained by a high-temperature radiator that is cooled by natural radiation of heat after manufacture in a high-temperature state in various types of equipment, and thereby to enable efficient use of the heat for power generation.

2. Background Art

Generally in an integrated iron and steel mill, after manufacturing steel, the molten steel is continuously cast to thereby form a steel billet such as a slab or the like, then the steel billet is hot-rolled, and the rolled sheet plate is formed into a hot-rolled coil rolled into a coil shape. Thereafter, an iron and steel product such as steel stock is manufactured by subjecting the hot-rolled coils to a predetermined processing such as cold rolling or the like.

In the above manner, steel billet such as a slab or the like that is continuously cast from molten steel during the process of manufacturing an iron and steel product reaches a temperature in excess of 1000° C. immediately after manufacture. Consequently the steel billet such as a slab or the like is transferred to a storage yard such as a slab yard for temporary storage before transfer to the subsequent rolling process and the residual heat in the steel billet such as a slab caused by the continuous casting is allowed to radiate. Normally, the billets are transferred to the next process in the order in which they entered the storage yard.

Furthermore since the hot-rolled coils immediately after manufacture reach a high temperature of 500-600° C., they are transferred to a coil yard to allow radiation of residual heat caused by the hot-rolling process and temporarily stored until transfer to a subsequent process. Normally, the hot-rolled coils are transferred to the next process in the order in which they entered the coil yard.

A thermal power plant building and wind power generation system has been proposed in which a wind power generation means that generates power using an ascending airflow produced by heat from the power generation equipment and an exhaust port by which the ascending airflow is discharged are provided in a thermal power plant building that houses power generating equipment. Furthermore this system also proposes a configuration of the thermal power plant building into a boiler building or turbine building. According to the thermal power plant building and wind power generation system, heat produced by the power generation equipment disposed in the thermal power plant building can be used for power generation by a wind power generating means that uses an ascending airflow produced by air heated by radiation of heat (for example, refer to Japanese Patent Application, First Publication No. 2006-77676).

Furthermore, one of a power generating unit that makes effective use of solar energy, a draft-duct type power generation apparatus has been proposed which is formed by a solar collector that uses solar radiation to heat air, a draft duct (chimney) that introduces air heated by the solar collector to thereby produce an ascending airflow caused by the buoyancy of heated air, and a power generating turbine that is disposed in the draft duct and generates power by using the ascending airflow produced in the draft duct (for example, refer to Japanese Patent Application, First Publication No. 2007-77941).

DISCLOSURE OF THE INVENTION

Problem to be Solved by the Invention

However in an integrated iron and steel mill, although a large amount of heat is introduced during manufacture of intermediate iron and steel products, hot-rolled coils or the like or steel billets such as slabs, the residual heat in intermediate iron and steel products manufactured under a high temperature merely radiates into the atmosphere and is not used in any particularly efficient manner. However in view of reducing $CO_2$ emissions which has become an issue in recent years, it is desirable that the heat radiated from intermediate iron and steel products manufactured under a high temperature by introducing heat as described above is recovered and efficiently used as energy.

As a result, in a similar manner to the thermal power plant building and wind power generation system as described in Japanese Patent Application, First Publication No. 2006-77676, it has been proposed to install wind power generating equipment in an integrated iron and steel mill in a building that houses hot rolling equipment that manufactures hot-rolled coils or in a building that houses continuous casting equipment for the manufacture of steel billets such as slabs or the like. However even for equipment that manufactures intermediate iron and steel products at a high temperature as described above, there is a limit on the heat amount radiated by individual intermediate iron and steel products manufactured in sequence on a single manufacturing line. Moreover since the manufactured intermediate iron and steel products are exported in sequence, the amount of heat that is radiated by the intermediate iron and steel products in the building that houses the manufacturing equipment is limited. Furthermore the large scale of the building that houses the manufacturing equipment for intermediate iron and steel products causes a low overall heat density in the building and thus it is difficult to execute efficient power generation.

The draft duct power generation apparatus described in Japanese Patent Application, First Publication No. 2007-77941, uses solar light as a heat source and therefore there is no teaching whatsoever regarding the recovery of heat radiated from a high-temperature heat radiating body such as an intermediate iron and steel product manufactured under a high-temperature condition.

Research and modifications were employed by the present inventors to enable efficient use of heat radiated from a high-temperature heat radiating body such as an intermediate iron and steel product which cools naturally as described above after being manufactured under high-temperature conditions resulting from the introduction of heat in various types of equipment. As a result, normally the heat density is increased by the accumulation and storage of many high-temperature heat radiating bodies in a storage yard such as a slab yard in which steel billets such as slabs or the like are temporarily stored, or a storage yard for temporarily storing a high-temperature radiator manufactured under a high-temperature condition in various types of equipment such as a coil yard for the temporary storage of hot-rolled coils. Moreover, when a steel billet such as a slab or the like, or a hot-rolled coil that is in a high-temperature condition immediately after manufacture is newly imported into a storage yard such as a slab yard or a coil yard, export from the yard is executed in sequence with reference to those objects that have sufficiently radiated heat as a result of prior conveyance into the yard and long-term placement therein, and the total amount of high-temperature heat radiating bodies that are deposited therein does not undergo much change. Consequently, emphasis was focused on the point that the sum of the heat amount retained by the stored high-temperature radiator undergoes little variation and the point that heat held by the high-temperature heat radiating bodies can be efficiently recovered in the yard since almost all the radiation of heat from these bodies occurs in the yard. From the above points, the invention was founded on the insights that a high heat density can be obtained from high-temperature heat radiating bodies that are accumulated and stored in a temporary storage yard for high-temperature heat radiating bodies manufactured under high-temperature conditions by introduction of heat during manufacture, the sum of the heat amount in the stored high-temperature heat radiating bodies undergoes little variation, and almost all heat radiation occurs in the yard. Therefore an air temperature in the storage yard can be stably and efficiently increased. When an ascending airflow produced from heated air is used, the retained energy in the high-temperature heat radiating bodies enables stable power generation with little waste.

Therefore an object of the present invention is to provide a high-temperature radiator storage yard generating apparatus that enables power generation by efficient recovery of heat retained in a high-temperature radiator that is manufactured under a high-temperature condition by introduction of heat. Furthermore another object of the present invention is to provide a high-temperature radiator storage yard generating apparatus that can also be employed in an existing high-temperature radiator storage yard without interference to the existing operation of the high-temperature radiator storage yard and that does not require large renovation works on the ceiling portion of the building. Furthermore another object of the present invention is a high-temperature radiator storage yard generating apparatus that increases the temperature increase of air that is heated by heating convection with the high-temperature radiator by increasing the heat exchange time between the air entering into the high-temperature radiator storage yard and the high-temperature radiator stored in the high-temperature radiator storage yard, and thereby further reduce the density of ascending air in the air discharge tower, increase the operating energy of heated air ascending in the air discharge tower and further increase the energy recoverable by the power generating turbine. A further object of the present invention is to provide a high-temperature radiator storage yard generating apparatus that, in comparison to using only natural convection heating, increases the total amount of gas flow heated in the high-temperature heat radiator storage yard to produce buoyancy and thereby further increases the energy recoverable by the power generating turbine.

Means for Solving the Problem

In order to solve the above problems, the present invention has a configuration in which a chimney having an upper portion configured into a cylindrical portion extending upwardly is disposed in a ceiling portion of a building of a high-temperature radiator storage yard that temporarily accumulates and stores a high-temperature radiator, and a power generating turbine that generates power with an ascending airflow is disposed at a predetermined position in the cylindrical portion in the chimney to thereby generate power with an ascending airflow.

In the above configuration, an intake port may be provided in a lower portion of a side wall of the building that houses the high-temperature radiator storage yard.

Furthermore in each of the above configurations, radiant heat-receiving panels separated by a predetermined space from facing side walls may be provided on an inner side of the side wall of the building that houses the high-temperature radiator storage yard.

Furthermore in each of the above configurations, the radiant heat-receiving panels may be disposed vertically at a predetermined position in an upper portion of the building that houses the high-temperature radiator storage yard that does not interfere with the stored high-temperature radiator.

Furthermore in each of the above configurations, the high-temperature heat radiating body may be an intermediate iron and steel product in an iron mill and the high-temperature radiator storage yard may be a storage yard for temporary storage of the intermediate iron and steel product.

In the above configuration, the intermediate iron and steel product may be a hot-rolled coil manufactured by hot-rolling equipment in the iron mill, and the storage yard for temporarily storing the intermediate iron and steel product may be a coil yard.

In the above configuration, the high-temperature heat radiator may be a hot-rolled coil manufactured by hot-rolling equipment in the iron mill, and an end portion in the exporting direction of the hot-rolled coil in the building that houses the hot-rolling equipment may communicate with and be connected to a side portion of the building that houses the high-temperature heat radiator storage yard that temporarily stores and accumulates the hot-rolled coils to enable air intake.

Furthermore in the above configuration, the radiation heat receiving panels may be provided on an inner side of a side wall except for a side portion of the hot-rolling equipment forming a connecting portion with the building in the building that houses the high-temperature heat radiator storage yard that temporarily stores and accumulates the hot-rolled coils.

In each of the above configurations, a gridiron type member may be provided on the floor of the building for the high-temperature heat radiator storage yard and the high-temperature heat radiator may be loaded thereon.

In each of the above configurations, an insulating member having high-temperature resistant properties may be arranged on an inner bottom portion of the building for the high-temperature heat radiator storage yard.

In another embodiment to the above, a predetermined position of the building for the high-temperature heat radiator storage yard that temporarily accumulates and stores the high-temperature heat radiator communicates with and is connected through a connecting duct to a lower end portion of the air discharge tower that extends in a vertical direction and is provided on an outer portion separately to the building. Furthermore a power generating turbine is provided at a predetermined position on the air discharge tower or the connecting duct, and air imparted with buoyancy by heating in the building is introduced into the air discharge tower through the connecting duct to thereby generate power by the airflow passing through the air discharge tower.

A predetermined position of the building for the high-temperature heat radiator storage yard that temporarily accumulates and stores the high-temperature heat radiator communicates with and is connected through a connecting duct to a lower end portion of the air discharge tower that extends in a vertical direction and is provided on an outer portion separately to the building. A water spraying nozzle for spraying water onto the high-temperature heat radiator stored in the building is provided at a predetermined position on a ceiling portion in the building and a power generating turbine is provided at a predetermined position on the air discharge tower or the connecting duct. Further, steam that is produced by evaporation of water sprayed from the water spraying nozzle resulting from heat retained in the high-temperature heat radiator and air imparted with buoyancy by heating in the building are introduced into the air discharge tower through the connecting duct to thereby generate power by the air and the steam passing through the air discharge tower.

In each of the configurations above, a funnel for air discharge equipment may be used as the air discharge tower that is separate from the building.

Furthermore, in each of the configurations above, the high-temperature heat radiator may be an intermediate iron and steel product in the iron mill, and the building that houses the high-temperature heat radiator storage yard that communicates with and is connected through a connecting duct to a lower end portion of the air discharge tower may be the building that houses the storage yard that temporarily stores and accumulates the intermediate iron and steel product.

Furthermore in the above configuration, the intermediate iron and steel product forming the high-temperature heat radiator is a hot-rolled coil that is manufactured by hot-rolling equipment in the iron mill and the building that houses the storage yard acting as the building for the storage yard of the high-temperature heat radiator that temporarily stores and accumulates the intermediate iron and steel product and communicates with and is connected through a connecting duct to a lower end portion of the air discharge tower may be a building that houses the coil yard.

Furthermore, in the above configuration, the end portion in the exporting direction of the hot-rolled coil in the building that houses the hot-rolling equipment may communicate with and be connected to enable air intake with a side portion of the building that houses the coil yard that temporarily stores and accumulates the intermediate iron and steel product and is connected through a connecting duct to a lower end portion of the air discharge tower.

Next in yet another embodiment separate from the above, a lower end portion of an air discharge tower extending vertically and provided on an upper side of the building communicates with and is connected to a central portion of the ceiling of the building of the high-temperature heat radiator storage yard that temporarily stores and accumulates high-temperature heat radiator. Furthermore air ducts enabling inflow of air in a horizontal direction along an inner face of the building peripheral wall may be provided at a plurality of predetermined positions on the peripheral wall of the building so that the inflow direction of air inflowing in a horizontal direction into the building through each air duct meets at either one of a clockwise or a counterclockwise air circulation direction when viewed on a plane, and furthermore a power generating turbine may be provided at a predetermined position on the air discharge tower.

A lower end portion of the air discharge tower extending vertically and provided on an upper side of the building communicates with and is connected to a central portion of the ceiling of the building of the high-temperature heat radiator storage yard that temporarily stores and accumulates high-temperature heat radiating bodies. A water spraying nozzle for spraying water onto the high-temperature heat radiator stored in the building is provided at a predetermined position on the ceiling portion in the building. Furthermore air ducts enabling inflow of air in a horizontal direction along an inner face of the building peripheral wall are provided at a plurality of predetermined positions on the peripheral wall of the building so that the inflow direction of air inflowing in a horizontal direction into the building through each air duct meets at either one of a clockwise or a counterclockwise air circulation direction when viewed on a plane, and furthermore a power generating turbine is provided a predetermined position on the air discharge tower. Steam that is produced by evaporation of water sprayed from the water spraying nozzle resulting from heat retained in the high-temperature heat radiator and air undergoing revolving flow in the building due to inflow from the air duct into the building are introduced into the air discharge tower to thereby generate power by driving the power generating turbine with the ascending airflow of air and steam that rises in the air discharge tower.

Furthermore, in each of the configurations above, the high-temperature heat radiator may be an intermediate iron and steel product in the iron mill, and the building of the high-temperature heat radiator storage yard provided with an air duct at a plurality of predetermined positions on a peripheral wall may be a building of the storage yard that temporarily stores and accumulates the intermediate iron and steel product.

Furthermore, in the above configuration, the intermediate iron and steel product acting as the high-temperature heat radiator may be a hot-rolled coil manufactured by hot-rolling equipment in the iron mill, and the building of the storage yard acting as the high-temperature heat radiator storage yard temporarily storing the intermediate iron and steel product and provided with an air duct at a plurality of predetermined positions on a peripheral wall may be a building of a coil yard.

In yet a further embodiment to the above, a lower end portion of an air discharge tower extending vertically and provided on an upper side of the building communicates with and is connected to a predetermined position on the ceiling of the building of the high-temperature heat radiator storage yard that temporarily stores and accumulates high-temperature heat radiator. Furthermore a water spraying nozzle is provided at a predetermined position on a ceiling portion of an inner portion of the building, and is connected through a water supply line with a water pump. A power generating turbine may be disposed at a predetermined position of the air discharge tower.

Furthermore a lower end portion of an air discharge tower extending vertically and provided on an upper side of the building communicates with and is connected to a predetermined position on the ceiling of the building of the high-temperature heat radiator storage yard that temporarily stores and accumulates high-temperature heat radiator. Furthermore, a water spraying nozzle is provided at a predetermined position on a ceiling portion of an inner portion of the building, and is connected through a water supply line with a rainwater tank provided at a higher position than the position at which the water spraying nozzle is disposed. A power generating turbine may be disposed at a predetermined position of the air discharge tower.

Furthermore, in each of the configurations above, a plurality of water spraying nozzles may be provided at predetermined positions on a ceiling portion of an inner portion of the building, and a water supply valve may be provided corresponding to each of the water spraying nozzles.

Furthermore, in each of the configurations above, the high-temperature heat radiator may be an intermediate iron and steel product in an iron mill, and the building of the high-temperature heat radiator storage yard in which a water spraying nozzle is provided at a predetermined position on a ceiling portion may be a building of a storage yard for temporary storage of the intermediate iron and steel product.

In addition, in the above configuration, the intermediate iron and steel product acting as the high-temperature heat radiator may be a hot-rolled coil manufactured by hot-rolling equipment in the iron mill, and the building of the storage yard acting as the building that houses the high-temperature heat radiator storage yard for temporary storage of the high-temperature heat radiator and in which a water spraying nozzle is provided at a predetermined position on a ceiling portion may be a building of the coil yard.

Effects of the Invention

The high-temperature heat radiator storage yard generating apparatus according to the present invention displays the following excellent effects.

(1) A chimney with an upper portion configured into a cylindrical portion extending upwardly is disposed in a ceiling portion of a building of a high-temperature heat radiator storage yard that temporarily accumulates and stores a high-temperature heat radiator, and a power generating turbine that generates power using an ascending airflow is located at a predetermined position in the cylindrical portion. In this manner, air in the high-temperature heat radiator storage yard is heated mainly by convection heating as a result of heat retained in the high-temperature heat radiator that has been manufactured by introduction of heat. The ascending airflow produced by the buoyancy due to the reduction in the density of the heated air becomes concentrated in and flows through the cylindrical portion of the chimney. Since power generation is enabled by rotating the power generation turbines with the ascending airflow in the cylindrical portion of the chimney, the heat retained in the high-temperature heat radiator can be efficiently used.

(2) Since an intake port is provided in a lower portion of a side wall of the building of the high-temperature heat radiator storage yard, low-temperature external air can be drawn into a lower portion in the building by an intake port. The air that is drawn into the lower portion of the building is heated by the heat retained in the high-temperature heat radiating body in the building to thereby create an ascending airflow. As a result, an ascending airflow towards the chimney in the building can be efficiently produced, and it is possible to execute efficient power generation with the power generating turbine.

(3) A configuration is provided in which a radiant heat-receiving panel separated by a predetermined space from facing side walls may be provided on an inner side of the side wall of the building of the high-temperature heat radiator storage yard, or a configuration is provided in which a radiant heat-receiving panel is disposed in a vertical direction at a predetermined position in an upper portion of the building of the high-temperature heat radiator storage yard that does not interfere with the stored high-temperature heat radiator. In this manner, in addition to the temperature increase in the air in the building due to convection heating from the high-temperature heat radiator, since it is also possible to heat the air in the building with the convection heat from the radiant heat-receiving panel that is heated by absorbing heat radiated by the high-temperature heat radiator, the amount of power generation by the power generating turbine can be increased due to the strengthening of the ascending airflow produced in the building. Furthermore a configuration in which the radiant heat-receiving panels are separated by a predetermined space from the side wall can limit the position at which the ascending airflow can be produced in the building to the vicinity of the side wall.

(4) When the high-temperature heat radiator is an intermediate iron and steel product in an iron mill, and the high-temperature heat radiator storage yard is a storage yard for temporary storage of the intermediate iron and steel product, heat retained in the intermediate iron and steel product manufactured under a high-temperature condition in the iron mill can be efficiently used for power generation.

(5) When the intermediate iron and steel product is a hot-rolled coil manufactured by hot-rolling equipment in the iron mill, and the storage yard for temporarily storing the intermediate iron and steel product is a coil yard, heat retained in the hot-rolled coil manufactured under a high-temperature condition can be efficiently used for power generation.

(6) In the configuration described in (1), since the high-temperature heat radiator is a hot-rolled coil manufactured by hot-rolling equipment in the iron mill, and an end portion in the exporting direction of the hot-rolled coils in the building of the hot-rolling equipment communicates with and is connected to enable air intake with a side portion of the building of the high-temperature heat radiator storage yard that temporarily stores and accumulates the hot-rolled coils, heat retained in the hot-rolled coils manufactured under a high-temperature condition by the hot-rolling equipment in the iron mill can be efficiently used for power generation. Furthermore air that has a higher temperature than external air due to the heat radiated in the hot-rolling processing steps in the building for the hot-rolling equipment can be aspirated into the building that houses the high-temperature heat radiator storage yard that stores the hot-rolled coils. As a result, the temperature of the air heated as a result of heat retained by the hot-rolled coils in the building can be further increased, thereby increasing the final temperature of the air at the upper end discharge port of the cylindrical portion of the chimney. Therefore the strength of the draft of air passing through the cylindrical portion of the chimney can be increased to thereby increase the power generation amount by the power generating turbine.

(7) In the configuration in (6), the provision of a radiating heat panel on an inner side of a side wall, except for a side portion of the hot-rolling equipment forming a connecting portion with the building of the high-temperature heat radiator storage yard that temporarily stores and accumulates the hot-rolled coils, enables further increase in the heating efficiency for air in the building. As a result, the ascending airflow produced in the building can be further strengthened and thereby enables a further increase to the power generation amount.

(8) A configuration in which a gridiron type member is located on the floor of the building for the high-temperature heat radiator storage yard and the high-temperature heat radiator is loaded thereon enables air to pass through the lower side of the gridiron member above onto a lower side of the high-temperature heat radiator, the intermediate iron and steel product acting as the high-temperature heat radiator, or the hot-rolled coil acting as an intermediate iron and steel product in the building of the high-temperature heat radiator storage yard. In this manner, transmission of convection heat can be promoted in the air in the building due to heat retained in the high-temperature heat radiator, the intermediate iron and steel product acting as the high-temperature heat radiator, or the hot-rolled coil acting as an intermediate iron and steel product. Therefore air in the building can be more efficiently heated. As a result, the ascending airflow produced in the building can be further strengthened and thereby enables a further increase to the power generation amount.

(9) Since an insulating member having high-temperature resistant properties is arranged on an inner bottom portion of the building for the high-temperature heat radiator storage yard, it is possible to suppress dissipation of heat from the bottom of the building into the ground surface. Consequently, the heat amount applied for heating the air in the building can be increased and the heating efficiency for air in the building can be increased. Consequently, a further increase to the power generation amount is enabled as a result of strengthening the ascending airflow that is produced in the building.

(10) A predetermined position of the building of the high-temperature heat radiator storage yard that temporarily accumulates and stores the high-temperature heat radiator body communicates with and is connected through a connecting duct to a lower end portion of the air discharge tower that extends in a vertical direction and is provided on an outer portion separately to the building. Furthermore a power generating turbine is provided at a predetermined position on the air discharge tower or the connecting duct, and air that is imparted with buoyancy by heating in the building is introduced into the air discharge tower through the connecting duct to thereby generate power by the airflow passing through the air discharge tower. In this manner, heat retained in the high-temperature heat radiator that is manufactured by introduction of heat can be used to heat air mainly by convection heat in the building of the high-temperature heat radiator storage yard. Air imparted with buoyancy by heating is introduced into a lower end portion of the air discharge tower through the connecting duct to thereby produce an ascending airflow in the air discharge tower and generate power by turning the power generating turbine with the ascending airflow.

(11) Since the air discharge tower is provided separately to the building for the high-temperature heat radiator storage yard, construction work for an air discharge tower requiring a number of days to realize the power generation apparatus for a high-temperature heat radiator storage yard according to the present invention can be executed without having any effect on the high-temperature heat radiator storage yard. In this manner, even when the high-temperature heat radiator storage yard generating apparatus according to the present invention is implemented in an existing high-temperature heat radiator storage yard, a risk of impediment to the operation of the existing high-temperature heat radiator storage yard can be avoided and its operation can be continued.

(12) A predetermined position of the building of the high-temperature heat radiator storage yard that temporarily accumulates and stores the high-temperature heat radiator communicates with and is connected through a connecting duct to a lower end portion of the air discharge tower that extends in a vertical direction and is provided on an outer portion separately to the building. A water spraying nozzle for spraying water onto the high-temperature heat radiator stored in the building is provided at a predetermined position on the ceiling portion in the building. Furthermore a power generating turbine is provided at a predetermined position on the air discharge tower or the connecting duct. Steam that is produced by evaporation of water sprayed from the water spraying nozzle as a result of heat retained in the high-temperature heat radiator together with air imparted with buoyancy by heating in the building are introduced into the air discharge tower through the connecting duct to thereby generate power as a result of the air and the steam passing through the air discharge tower. In this manner, in addition to the same effect as (11) and (12), since water sprayed from the water spraying nozzle is evaporated by heat retained in the high-temperature heat radiator to produce large amounts of heated steam and the resulting steam is mixed with the airflow introduced from the building through the connecting duct into the air discharge tower, it is possible to increase the amount of heated gases ascending into the air discharge tower. In this manner, the wind speed of the airflow ascending inside the air discharge tower is radically increased, thereby increasing the energy that is recoverable by the power generating turbine and thus enabling a marked increase in the output of the power generating turbine.

(13) Since the existing funnel for air discharge equipment is used as an air discharge tower that is separate from the building, construction work for the air discharge tower can be reduced thereby facilitating realization of the high-temperature heat radiator storage yard generating apparatus according to the present invention.

(14) The high-temperature heat radiator is an intermediate iron and steel product in the iron mill, and the building of the high-temperature heat radiator storage yard that communicates with and is connected through a connecting duct to a lower end portion of the air discharge tower is a building of the storage yard that temporarily stores and accumulates the intermediate iron and steel product. Thus heat retained in the intermediate iron and steel product manufactured under high-temperature conditions in the iron mill can be recovered as energy for efficient use in power generation.

(15) The intermediate iron and steel product forming the high-temperature heat radiator is a hot-rolled coil that is manufactured by hot-rolling equipment in the iron mill, and the building of the storage yard acting as the building of the storage yard of the high-temperature heat radiator that temporarily stores and accumulates the intermediate iron and steel product and communicates with and is connected through a connecting duct to a lower end portion of the air discharge tower is a building of the coil yard. Consequently, heat retained in the hot-rolling coil manufactured under high-temperature conditions can be recovered as energy for efficient use in power generation.

(16) The end portion in the exporting direction of the hot-rolled coil in the building of the hot-rolling equipment may communicate with and be connected to enable air intake with a side portion of the building of the coil yard that temporarily stores and accumulates the intermediate iron and steel product and is connected through a connecting duct to a lower end portion of the air discharge tower. As a result, air that has a higher temperature than external air due to the heat radiated in the hot-rolling processing steps in the building of the hot-rolling equipment can be aspirated into the building of the high-temperature heat radiator storage yard that stores the hot-rolled coils. As a result, the temperature of the air heated as a result of heat retained by the hot-rolled coils in the building can be further increased. Furthermore since the temperature of air introduced into the air discharge tower from the building of the coil yard through the connecting duct can be further increased, the flow speed of the ascending airflow in the air discharge tower can be increased and therefore the power generation amount by the power generating turbine can be increased.

(17) A lower end portion of an air discharge tower extending vertically and provided on an upper side of the building communicates with and is connected to a central portion of the ceiling of the building of the high-temperature heat radiator storage yard that temporarily stores and accumulates the high-temperature heat radiator. Furthermore air ducts enabling inflow of air in a horizontal direction along an inner face of the building peripheral wall are provided at a plurality of predetermined positions on the peripheral wall of the building so that the inflow direction of air inflowing in a horizontal direction into the building through each air duct meets at either one of a clockwise or a counterclockwise air circulation direction when viewed on a plane, and furthermore a power generating turbine is provided at a predetermined position on the air discharge tower. In this manner, air in the building of the high-temperature heat radiator storage yard is heated mainly by convection heating as a result of heat retained in the high-temperature heat radiator that has been manufactured by introduction of heat. The ascending airflow produced by buoyancy in the heated air becomes concentrated in and flows through the air discharge tower which is connected to the central portion of the ceiling of the building to thereby generate power by rotation of the power generating turbine. Moreover, when air in the outer portion of the building is introduced into the building through each air duct provided in the peripheral wall of the building due to the movement of air heated in the building towards the air discharge tower, the direction of air flow flowing in from each air duct is horizontal along the inner surface of the peripheral wall of the building and meets at either one of a clockwise or a counterclockwise air circulation direction when viewed on a plane. Consequently, a revolving air flow that displays a low level of vertical components can be produced in the building. In this manner, the heat exchange time between the air in the building and the high-temperature heat radiator can be increased, the air in the building can be efficiently heated to thereby enable introduction of more highly buoyant heated air into the air discharge tower. Thus, the air amount ascending through the inner portion of the air discharge tower can be increased and the energy that is recoverable by the power generating turbine can be increased. Therefore the output of the power generating turbine can be increased.

(18) Thus it is possible to shorten a period of time required to recover initial costs associated with installation of a high-temperature heat radiator storage yard generating apparatus according to the present invention in a building of a high-temperature heat radiator storage yard.

(19) A lower end portion of the air discharge tower extending vertically and provided on an upper side of the building communicates with and is connected to a central portion of the ceiling of the building of the high-temperature heat radiator storage yard that temporarily stores and accumulates high-temperature heat radiator. A water spraying nozzle for spraying water onto the high-temperature heat radiator stored in the building is provided at a predetermined position on the ceiling portion in the building. Furthermore air ducts enabling inflow of air in a horizontal direction along an inner face of the building peripheral wall are provided at a plurality of predetermined positions on the peripheral wall of the building so that the inflow direction of air inflowing in a horizontal direction into the building through each air duct meets at either one of a clockwise or a counterclockwise air circulation direction when viewed on a plane. Furthermore a power generating turbine is provided at a predetermined position on the air discharge tower. Steam that is produced by evaporation of water sprayed from the water spraying nozzle resulting from heat retained in the high-temperature heat radiator together with the revolving flow of air in the building due to inflow from the air ducts into the building are introduced into the air discharge tower to thereby generate power by driving the power generating turbine with the ascending airflow of air and steam that rises in the air discharge tower. In this manner, in addition to the same effect obtained in (17) and (18) above, since water sprayed from the water spraying nozzle is evaporated by heat retained in the high-temperature heat radiator to produce large amounts of heated steam and the resulting steam mixes with the airflow revolving in the building, it is possible to increase the amount of heated gases ascending from the building towards the air discharge tower. In this manner, the wind speed of the airflow ascending inside the air discharge tower is radically increased, thereby increasing the energy that is recoverable by the power generating turbine and thus enabling a marked increase in the output of the power generating turbine.

(20) The high-temperature heat radiator is an intermediate iron and steel product in the iron mill, and the building of the high-temperature heat radiator storage yard provided with an air duct at a plurality of predetermined positions on a peripheral wall is a building of the storage yard that temporarily stores and accumulates the intermediate iron and steel product. In this manner, heat that is retained in the intermediate iron and steel product manufactured under high-temperature conditions in the iron mill can be recovered as energy for efficient use in power generation.

(21) The intermediate iron and steel product acting as the high-temperature heat radiating body is a hot-rolled coil manufactured by hot-rolling equipment in the iron mill, and the building of the storage yard acting as the high-temperature heat radiator storage yard temporarily storing the intermediate iron and steel product and provided with air ducts at a plurality of predetermined positions on a peripheral wall is a building of a coil yard. In this manner, heat that is retained in the intermediate iron and steel product manufactured under high-temperature conditions can be recovered as energy for efficient use in power generation.

(22) A lower end portion of an air discharge tower extending vertically and provided on an upper side of the building communicates with and is connected to a predetermined position on the ceiling of the building of the high-temperature heat radiator storage yard that temporarily stores and accumulates high-temperature heat radiator. A water spraying nozzle is provided at a predetermined position on a ceiling portion of an inner portion of the building, and is connected through a water supply line with a water pump. Furthermore a power generating turbine is provided at a predetermined position of the air discharge tower and generates power by driving the power generating turbine with the ascending airflow. In this manner, air in the high-temperature heat radiator storage yard is heated mainly by convection heating as a result of heat retained in the high-temperature heat radiator that has been manufactured by introduction of heat. In addition, water sprayed from the water spraying nozzle is evaporated by heat retained in the high-temperature heat radiator to produce large amounts of heated steam. The ascending airflow produced by buoyancy in the heated air and the steam become concentrated in and flow through the air discharge tower to thereby generate power by rotation of the power generating turbine. In this manner, when compared to heating air in a high-temperature heat radiator storage yard using only convection heating, the wind speed of the airflow ascending inside the air discharge tower is radically increased, thereby increasing the energy that is recoverable by the power generating turbine and thus enabling a marked increase in the output of the power generating turbine.

(23) Thus it is possible to shorten a period of time required to recover initial costs associated with installation of a high-temperature heat radiator storage yard generating apparatus according to the present invention in a building of a high-temperature heat radiator storage yard.

(24) A lower end portion of an air discharge tower extending vertically and provided on an upper side of the building communicates with and is connected to a predetermined position on the ceiling of the building of the high-temperature heat radiator storage yard that temporarily stores and accumulates high-temperature heat radiator. Furthermore a water spraying nozzle is provided at a predetermined position on a ceiling portion of an inner portion of the building, and is connected through a water supply line with a rainwater tank provided at a higher position than the position at which the water spraying nozzle is disposed. Furthermore a power generating turbine may be disposed at a predetermined position of the air discharge tower and generates power by driving the power generating turbine with the ascending airflow. Consequently it is possible to obtain the same effect as (22) and (23) above. Furthermore the rainwater in the rainwater tank can be supplied by gravity feeding as water for spraying from each water spraying nozzle provided in a ceiling portion of the building. Therefore the energy used to supply water required for each spraying nozzle can be reduced and it is possible to reduce the energy consumed in order to recover the heat retained in the high-temperature heat radiator stored in the high-temperature heat radiator storage yard.

(25) A plurality of water spraying nozzles is provided at predetermined positions on a ceiling portion of an inner portion of the building and a water supply valve is provided corresponding to each of the water spraying nozzles. Thus water can be sprayed selectively from a water spraying nozzle into the group of high-temperature heat radiator which has a relatively high temperature in the high-temperature heat radiator storage yard. In this manner, steam can be efficiently produced by evaporation of sprayed water and it is possible to prevent a risk of water accumulating in the high-temperature heat radiator storage yard without evaporating.

(26) The high-temperature heat radiating body is an intermediate iron and steel product in an iron mill, and the building that houses the high-temperature heat radiator storage yard in which a water spraying nozzle is provided at a predetermined position on a ceiling portion is a building of a storage yard for temporary storage of the intermediate iron and steel product. In this manner, heat retained in the intermediate iron and steel product manufactured under high-temperature conditions in the iron mill can be recovered as energy for use in efficient power generation.

(27) The intermediate iron and steel product acting as the high-temperature heat radiator is a hot-rolled coil manufactured by hot-rolling equipment in the iron mill, and the building of the storage yard acting as the building of the high-temperature heat radiator storage yard for temporary storage of the high-temperature heat radiator in which a water spraying nozzle is provided at a predetermined position on a ceiling portion is a building of a coil yard. In this manner, heat retained in the hot-rolled coil manufactured under high-temperature conditions can be recovered as energy for use in efficient power generation.

BEST MODES FOR CARRYING OUT THE INVENTION

The best modes of carrying out the invention will be described below making reference to the figures.

Figure 1:
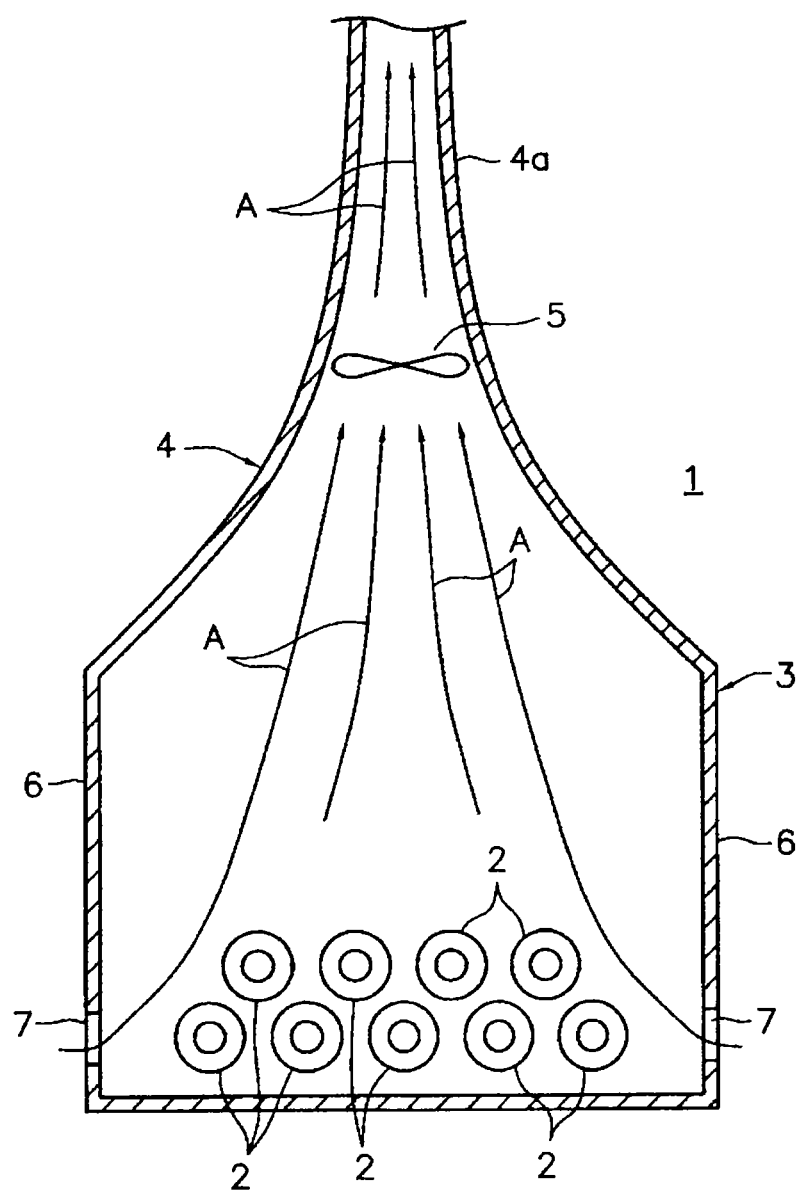
FIG. 1 is a schematic sectional side view showing a first embodiment of a high-temperature heat radiator storage yard generating apparatus according to the present invention when applied to a coil yard.

FIG. 1 shows an embodiment of a high-temperature heat radiator storage yard generation apparatus according to the present invention which is applied to a coil yard 1 which acts as a high-temperature heat radiator storage yard for the temporary storage of a hot-rolled coil 2 which is an intermediate iron and steel product acting as a high-temperature heat radiator that is manufactured using the hot-rolling equipment of an integrated iron and steel mill or the like, and the configuration thereof will be described below.

More specifically, a chimney 4 which has a lower portion substantially in the shape of a pyramid and an upper portion forming a cylindrical portion 4a that extends with a predetermined dimension upwardly is provided in a ceiling portion of a building 3 of a coil yard that is used for temporary storage of the hot-rolled coil 2 that is manufactured by introducing heat via hot-rolling equipment until transfer to a subsequent process. A power generating turbine 5 is provided at a predetermined position on the cylindrical portion 4a.

Moreover an intake duct 7 is provided in a lower end portion of the four side walls 6 of the building 3.

Although not shown in the figures, an export conveying port and an import conveying port for the hot-rolled coils 2 in the coil yard building 3 may be provided in a predetermined side wall 6 of the coil yard building 3 and may be provided with an opening and closing door. Furthermore an air intake duct similar to the above air intake duct 7 may be provided in a lower end portion of the door of the export conveying port and the import conveying port.

A conveying means (not shown) for the hot-rolled coils 2 may be provided in the building 3.

The hot-rolled coil 2 that is manufactured by a hot-rolling process causing introduction of heat from hot-rolling equipment (not shown) is imported by the import conveying port (not shown) into the building 3 of the coil yard 1 provided with a high-temperature heat radiator storage yard generating apparatus as described above, and is temporarily accumulated and stored until transfer to a subsequent processing step. In this manner, the heat retained in each hot-rolled coil 2 in the coil yard building 3 undergoes heat transfer into the air in the building 3 mainly due to convection heating, and thereby the air in the building 3 is heated. The heated air undergoes a reduction in density and displaces towards the chimney 4 in the ceiling portion by ascending in the building 3 due to the resulting buoyancy. After passing through the cylindrical portion 4a of the chimney 4, the air is released into an external portion from an upper end discharge port (not shown) in the cylindrical portion 4a. At this time, low-temperature external air is introduced into the building 3 through an air intake port 7 that is provided in a lower end portion of the four wall faces in the building 3 as a result of the air in the building 3 ascending towards the chimney 4. Thereafter, the air that has entered into the building 3 through the air intake port 7 is successively heated by convection heating from the hot-rolled coils 2, and in the same manner as the above, rises within the building 3 towards the chimney 4. Thus as shown by the arrow A in FIG. 1, an ascending airflow is produced that, after ascending towards the chimney 4 through an inner portion of the building 3 from the intake duct 7 provided in the four side walls 6, flows from a lower position upwardly in the cylindrical portion 4a. This ascending airflow drives a power generating turbine 5 that is provided in the cylindrical portion 4a of the chimney 4 to thereby execute wind-power power generation.

In the above manner, according to the high-temperature heat radiator storage yard generation apparatus according to the present invention, accumulation and storage of high-temperature hot-rolled coils 2 immediately after manufacture enables efficient heating of air using heat retained in hot-rolled coils 2 in the building 3 of the coil yard 1 that has an increased heat density. Consequently, an ascending airflow can be efficiently produced in the building 3 of the coil yard 1 by air that is efficiently heated by the heat retained in the hot-rolled coils 2. In this manner, the power generating turbine 5 that is provided in the cylindrical portion 4a of the chimney 4 can be efficiently driven to execute more efficient power generation.

Normally, when newly manufactured hot-rolled coils 2 having a large heat retention amount are successively imported into the coil yard 1, the earliest imported coil of the hot-rolled coils 2 that are already stored in the coil yard 1, that is to say, the hot-rolled coil 2 with the lowest temperature as a result of dissipating heat for the longest period is exported in that sequence through the export conveying port (not shown). Consequently there is little change in the total heat amount retained by the hot-rolled coils 2 stored in the building 3 of the coil yard 1. As a result, in the building 3 of the coil yard 1, since there is little long-term change in the heat amount used to heat the air from all the hot-rolled coils 2, stable heating of air is enabled, and the stable ascending airflow flows through the cylindrical portion 4a of the chimney 4. In this manner, stable power generation is enabled by the power generating turbine 5.

Figure 2:
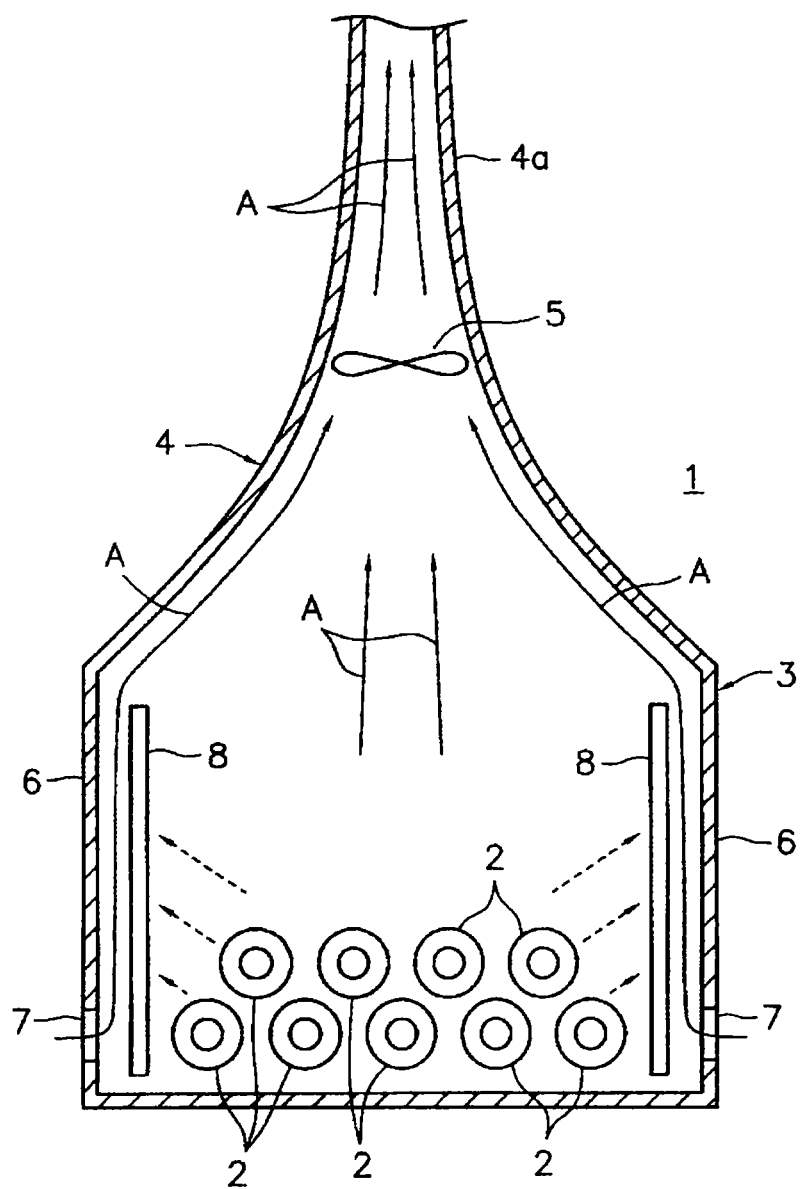
FIG. 2 is a schematic sectional side view showing a modified example of the apparatus shown in FIG. 1 as another embodiment of the present invention.

Next, FIG. 2 shows a modified example of the apparatus shown in FIG. 1 as another embodiment of the present invention. This example has a similar configuration to FIG. 1 in which a radiant heat-receiving panel 8 that is adapted to enable efficient absorption of radiant heat is disposed on an inner side of each side wall 6 of the building 2 of the coil yard 1 with a predetermined space between the surface of each side wall 6, for example, a space from several centimeters to ten centimeters, and is disposed to cover the interval from the position that covers an inner side of the intake duct 7 provided on a lower end portion of each side wall 6 to an upper end portion of each side wall 6. The panels 8 are mounted on the corresponding side walls 6 with a fixing member (not shown).

Each radiant heat-receiving panel 8 may be formed for example with a surface coating displaying a high absorption rate for ultraviolet-band wavelengths on a porous aluminum board.

Although not shown in the figures, the radiant heat-receiving panel 8 may also be mounted at a predetermined interval on an inner side of a door of the import conveying port and the export conveying port of the building 3 of the coil yard 1.

Other aspects of the configuration are the same as those shown in FIG. 1 and the same reference numerals are assigned to the same members.

According to this embodiment, when a hot-rolled coil 2 is manufactured by a hot-rolling process causing introduction of heat from hot-rolling equipment (not shown) and is imported by an import conveying port (not shown) into a building 3 of a coil yard 1 to be temporarily accumulated and stored until transfer to a subsequent processing step, air in the building 3 is heated by convection heat from each hot-rolled coil 2. Furthermore, radiant heat (shown by the broken line in the figure, same in the figures hereafter) emitted from each hot-rolled coil 2 in the coil yard building 3 is efficiently absorbed by each radiant heat-receiving panel 8 provided on an inner side of each side wall 6 and thereby heats each radiant heat-receiving panel 8. Consequently the air existing in proximity to the surface thereof is heated by convection heat from the radiant heat-receiving panels 8. At this time, a lower end portion of each radiant heat-receiving panel 8 is disposed on an inner side of the intake duct 7 provided on a lower end portion of each side wall 6 of the coil yard building 3. Therefore low-temperature external air introduced into the building 3 through each intake duct 7 is efficiently heated by convection heat from each radiant heat-receiving panel 8 and the resulting ascending airflow towards the ceiling portion through the space with the side wall 6 corresponding to each radiant heat-receiving panel 8 is produced by buoyancy.

In this manner, the present embodiment also enables the production of an ascending airflow ascending in the building 3 towards the chimney 4 of the ceiling portion and passing through the cylindrical portion 4a due to air heated by the heat source of the heat retained in hot-rolled coils 1 in the building 3 of the coil yard 1. Thus power generation is performed by driving a power generating turbine 5. Therefore the same effect as is produced by the embodiment shown in FIG. 1 is enabled.

Furthermore each radiant heat-receiving panel 8 disposed on an inner side of each side wall 6 is heated by absorption of radiant heat from the hot-rolled coils 2 to thereby produce convection heating into the air from each radiant heat-receiving panel 8 that mainly heats the air in the building 3. Therefore the region in which an ascending airflow is produced within the building 3 can be restricted to a region in proximity to each side wall 6. Consequently, it is possible to suppress a risk of the ascending airflow of heated air coming into contact with apparatuses (not shown) that are disposed in proximity to a central portion of the building 3.

Figure 3:
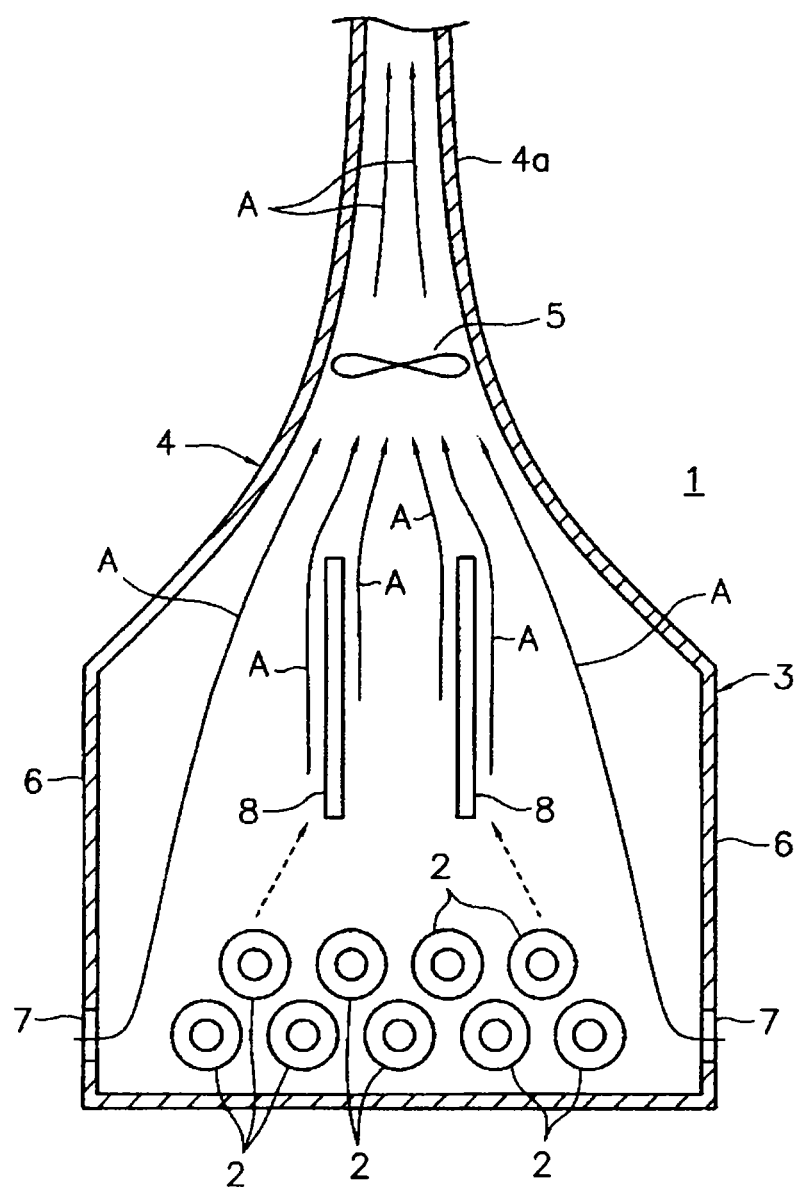
FIG. 3 is a schematic sectional side view showing another modified example of the apparatus shown in FIG. 1 as yet another embodiment of the present invention.

Next, FIG. 3 shows a modified example of the apparatus shown in FIG. 1 as yet another embodiment of the present invention. This example has a different configuration from FIG. 1 in that a radiant heat-receiving panel 8, that is the same as the radiant heat-receiving panel 8 shown in FIG. 2, is disposed at a position that does not cause interference with the stored hot-rolled coils 2 when the hot-rolled coils 2 are conveyed in an upper portion of the building 3 of the coil yard 1 in a direction that does not impede the ascending airflow of air produced inside the building 3, for example, in a vertical direction, and are mounted at a predetermined position on the chimney 4 or a predetermined position in the building 3 using a fixing member (not shown).

Other aspects of the configuration are the same as those shown in FIG. 1 and the same reference numerals are assigned to the same members.

According to this embodiment, when a hot-rolled coil 2 that is manufactured by a hot-rolling process causing introduction of heat from hot-rolling equipment (not shown) is imported by an import conveying port (not shown) into a building 3 of the coil yard 1, and is temporarily accumulated and stored until transfer to a subsequent processing step, air in the building 3 is heated by convection heat from each hot-rolled coil 2. Furthermore, radiant heat emitted from each hot-rolled coil 2 in the coil yard building 3 is efficiently absorbed by each radiant heat-receiving panel 8 and thereby heats each radiant heat-receiving panel 8. Consequently the air present in proximity to that surface is heated by convection heat from the radiant heat-receiving panels 8.

In this manner, the present embodiment also enables the production of an ascending airflow ascending in the building 3 towards the chimney 4 of the ceiling portion and passing through the cylindrical portion 4a as a result of air heated using the heat source of the heat retained in hot-rolled coils 2 in the building 3 of the coil yard 1 to thereby execute power generation by driving a power generating turbine 5. Thus the same effect as the embodiment shown in FIG. 1 is enabled. Furthermore the presence of the radiant heat-receiving panel 8 enables more efficient heating of air than the embodiment shown in FIG. 1, and increases the strength of the resulting ascending airflow, to thereby increase the power generation amount.

Figure 4:
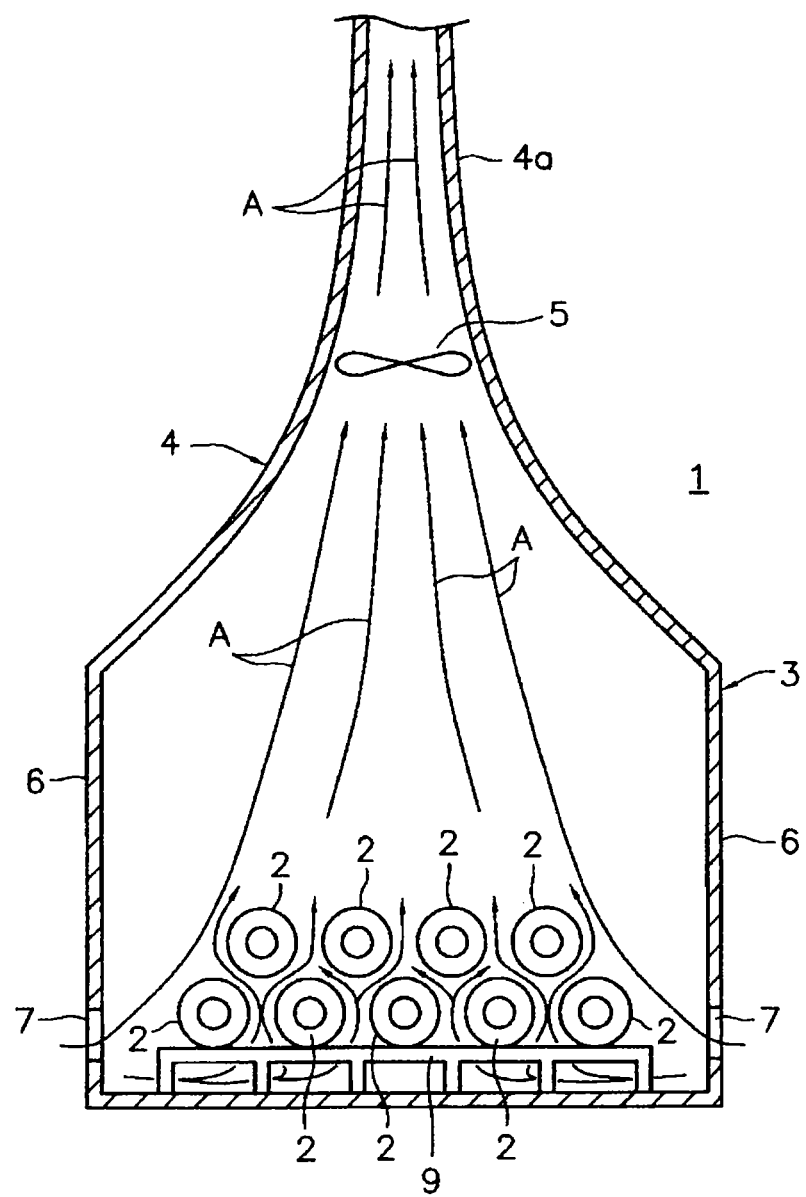
FIG. 4 is a schematic sectional side view showing yet another modified example of the apparatus shown in FIG. 1 as yet a further embodiment of the present invention.

FIG. 4 shows a modified example of the apparatus shown in FIG. 1 as yet a further embodiment of the present invention. This example has a different configuration from FIG. 1 in that a gridiron type member 9 is provided on a floor portion of the building 3 of the coil yard 1 and the hot-rolled coils 2 that are imported into the coil yard 1 are placed on an upper side of the gridiron type member 9 to thereby enable flow of air from below each hot-rolled coil 2 through the lower side of the gridiron type member 9.

The gridiron type member 9 may be composed of any material as long as it can withstand the weight of the hot-rolled coils 2 and the temperature of the hot-rolled coils 2 immediately after being imported into the coil yard 1.

Other aspects of the configuration are the same as those shown in FIG. 1 and the same reference numerals are assigned to the same members.

According to this embodiment, when a hot-rolled coil 2 that is manufactured by a hot-rolling process by introduction of heat from hot-rolling equipment (not shown) is imported by an import conveying port (not shown) into the building 3 of the coil yard 1, and is temporarily accumulated and stored until transfer to a subsequent processing step, air in the building 3 is heated by convection heat from each hot-rolled coil 2. At that time, since air can pass under each hot-rolled coil 2 by passing on the lower side of the gridiron type member 9 that is provided on the floor portion of the coil yard 1, low-temperature external air which is drawn in from an external portion through the intake duct 7 provided at a lower end portion of the three side walls of the building 3 is introduced from below to each hot-rolled coil 2 through the lower side of the gridiron type member 9. In this manner, since airflow is also enabled between the hot-rolled coils 2 or in the lower portion of each hot-rolled coil 2, transmission of convection heat into the air from heat retained in each hot-rolled coil 2 is promoted and thereby enables efficient heating of the air in the coil yard building 3. Thus it is possible to increase the strength of the ascending airflow produced in the building 3.

Therefore, the present embodiment also enables the production of an ascending airflow ascending in the building 3 as a result of air heated using the heat source of the heat retained in hot-rolled coils 2 in the building 3 of the coil yard 1 to thereby execute power generation by driving the power generating turbine 5 provided in the cylindrical portion 4a of the chimney 4 in the ceiling portion. Thus the same effect as the embodiment shown in FIG. 1 is enabled. Furthermore since the strength of the resulting ascending airflow produced in the building 3 is increased, the power generation amount can be increased in comparison with the embodiment shown in FIG. 1.

Figure 5:
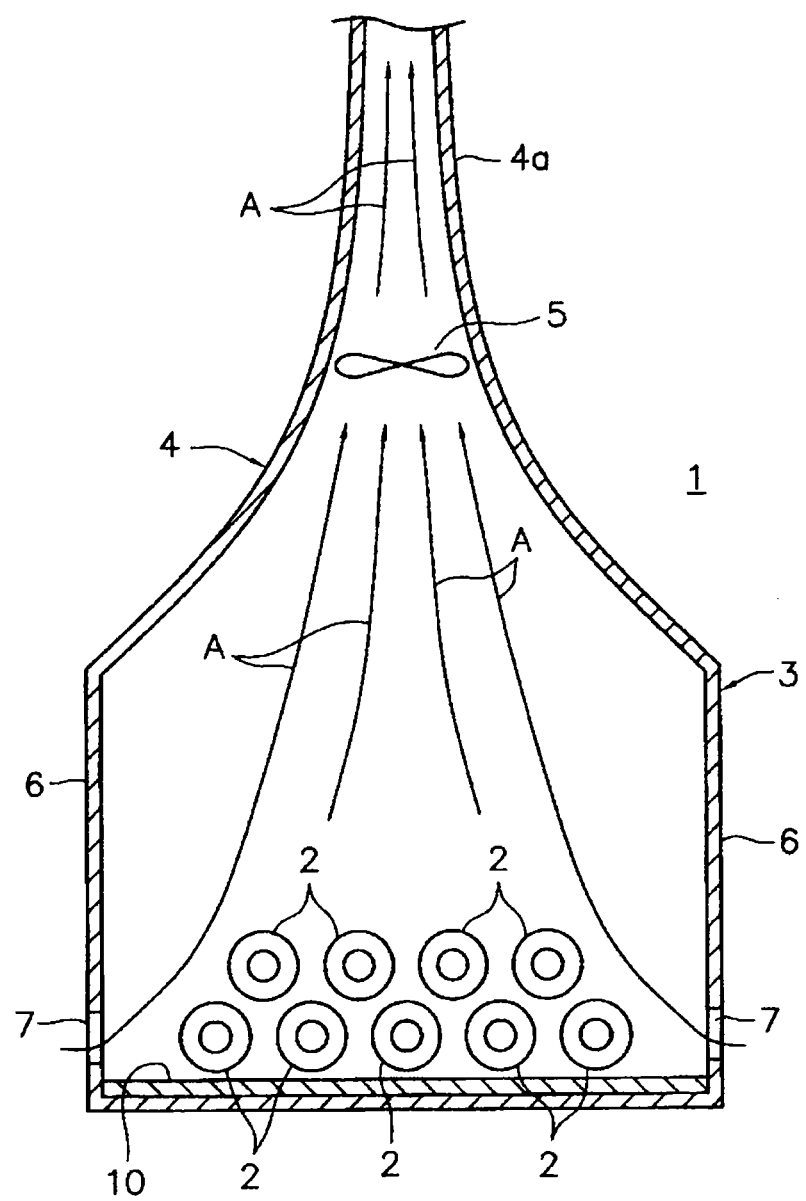
FIG. 5 is a schematic sectional side view showing yet another modified example of the apparatus shown in FIG. 1 as yet a further embodiment of the present invention.

FIG. 5 shows a modified example of the apparatus shown in FIG. 1 as yet a further embodiment of the present invention. This example has a different configuration from FIG. 1 in that an insulating member 10 having resistant properties to high temperatures, for example, an insulating member 10 such as a heat-resistant brick is arranged in the inner bottom portion of the building 3 of the coil yard 1, and from the inner bottom portion of the building 3 is formed an insulating structure to thereby enable suppression of the dissipation of heat from the bottom of the building into the ground surface.

Other aspects of the configuration are the same as those shown in FIG. 1 and the same reference numerals are assigned to the same members.

According to this embodiment, when a hot-rolled coil 2 that is manufactured by a hot-rolling process by introduction of heat from hot-rolling equipment (not shown) is imported by an import conveying port (not shown) into the building 3 of the coil yard 1, and is temporarily accumulated and stored until transfer to a subsequent processing step, air in the building 3 is heated by convection heat from each hot-rolled coil 2. At that time, since the insulating member 10 is arranged in the inner bottom portion of the coil yard 1, even when the inner bottom portion of the building 3 is heated by the conduction heat or the radiant heat of the hot-rolled coils 2, that heat can be prevented from dissipating into the ground surface below the building 3. In this manner, dissipation of heat into the ground surface from the building 3 can be suppressed, and the amount of heat available for heating of the air inside the building 3 can be increased. Therefore it is possible to increase the heating efficiency for air in the building 3 and to increase the strength of the ascending airflow produced in the building 3.

As a result, the present embodiment also enables the production of an ascending airflow ascending in the building 3 as a result of air heated using the heat source of the heat retained in hot-rolled coils 2 in the building 3 of the coil yard 1 to thereby execute power generation by driving the power generating turbine 5 provided in the cylindrical portion 4a of the chimney 4 in the ceiling portion. Thus the same effect as the embodiment shown in FIG. 1 is enabled. Furthermore since the strength of the resulting ascending airflow produced in the building 3 is increased, the power generation amount can be increased in comparison with the embodiment shown in FIG. 1.

Figure 6:
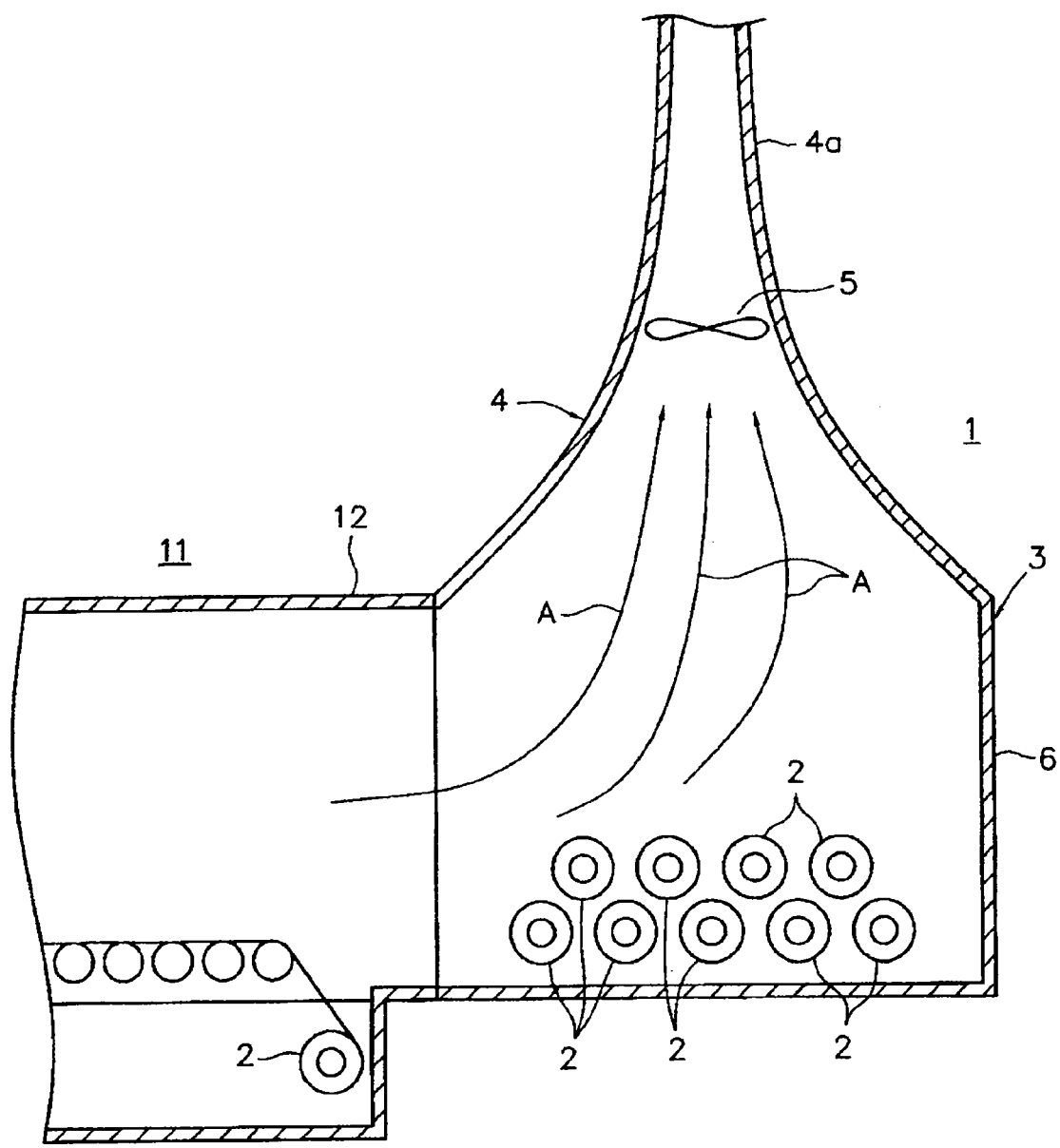
FIG. 6 is a schematic sectional side view showing an applied example of the apparatus shown in FIG. 1 as yet a further embodiment of the present invention.

FIG. 6 shows an applied example of the apparatus shown in FIG. 1 as yet a further embodiment of the present invention. This example has a similar configuration to FIG. 1 in that a chimney 4 is provided in a ceiling portion of the building 3 of the coil yard 1 and the power generating turbine 5 is provided in the cylindrical portion 4a of the chimney 4. However, one side portion which forms an import conveying port side in the building 3 of the coil yard 1 communicates with and is connected to an end portion on the extraction side for hot-rolled coils 2 in the building 12 for hot-rolling equipment 11 in which the hot-rolled coils 2 are manufactured using hot-rolling processes in which heat is introduced. The building 3 of the coil yard 1 is integrated with the building 12 of the hot-rolling equipment.

Since there is a configuration in which air is drawn from the building 12 of the hot-rolling equipment 11 into the building 3 of the coil yard 1, the intake duct 7 of the side walls 6 can be omitted. Other aspects of the configuration are the same as those shown in FIG. 1 and the same reference numerals are assigned to the same members.

According to this embodiment, when a hot-rolled coil 2 that is manufactured by hot-rolling equipment 11 is imported into the building 3 of the coil yard 1, and is temporarily accumulated and stored until transfer to a subsequent processing step, in the same manner as the apparatus shown in FIG. 1, air in the building 3 is mainly heated and undergoes a reduction in density due to convection heating from heat retained in each hot-rolled coil 2 in the coil yard building 3, and the resulting buoyancy produces an ascending airflow that rises in the building 3 towards the chimney 4 in the ceiling portion and passes through an inner portion of the cylindrical portion 4a.

As a result, when air in the building 3 of the coil yard 1 rises towards the chimney 4, the air in the building 12 is drawn into the building 3 of the coil yard 1 through the connection points in the building 3 with the building 12 of the hot-rolling equipment 11. This air is successively heated by the convection heat from the hot-rolled coils 2 in the building 3. At that time, in the building 12 of the hot-rolling equipment 11, the air in the building 12 is heated in excess of an external air temperature due to the heat radiated during the hot-rolling process. Consequently the introduction of this air into the building 3 of the coil yard 1 further increases the temperature of air heated by convection heat from the hot-rolled coils 2 in the building 3 of the coil yard 1 and increases the final temperature of air at the upper end discharge port of the cylindrical portion 4a of the chimney 4 provided in the ceiling portion. Consequently the strength of the air draft passing through the cylindrical portion 4a can be increased.

As a result, the present embodiment also enables the production of an ascending airflow ascending in the building 3 towards the chimney 4 in the ceiling portion and passing through the cylindrical portion 4a as a result of air heated using the heat source of the heat retained in hot-rolled coils 2 in the building 3 of the coil yard 1 to thereby execute power generation by driving the power generating turbine 5 provided in the cylindrical portion 4a of the chimney 4 in the ceiling portion. Thus the same effect as the embodiment shown in FIG. 1 is enabled. Furthermore since the strength of the draft of the ascending airflow that drives the power generating turbine 5 can be increased, the power generation amount can be increased.

Figure 7:
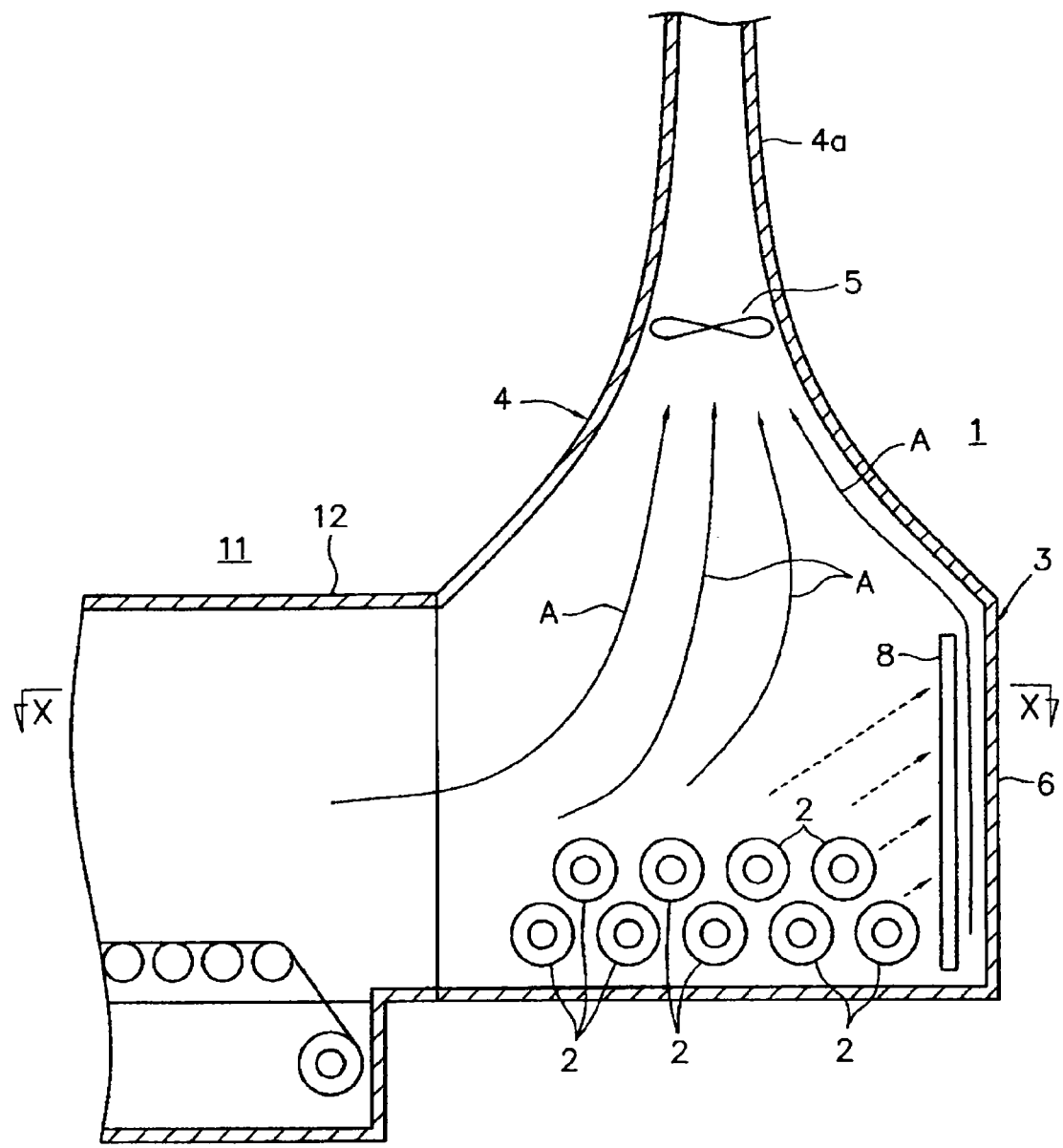
FIG. 7 is a schematic sectional side view showing a modified example of the apparatus shown in FIG. 6 as yet a further embodiment of the present invention.
Figure 8:
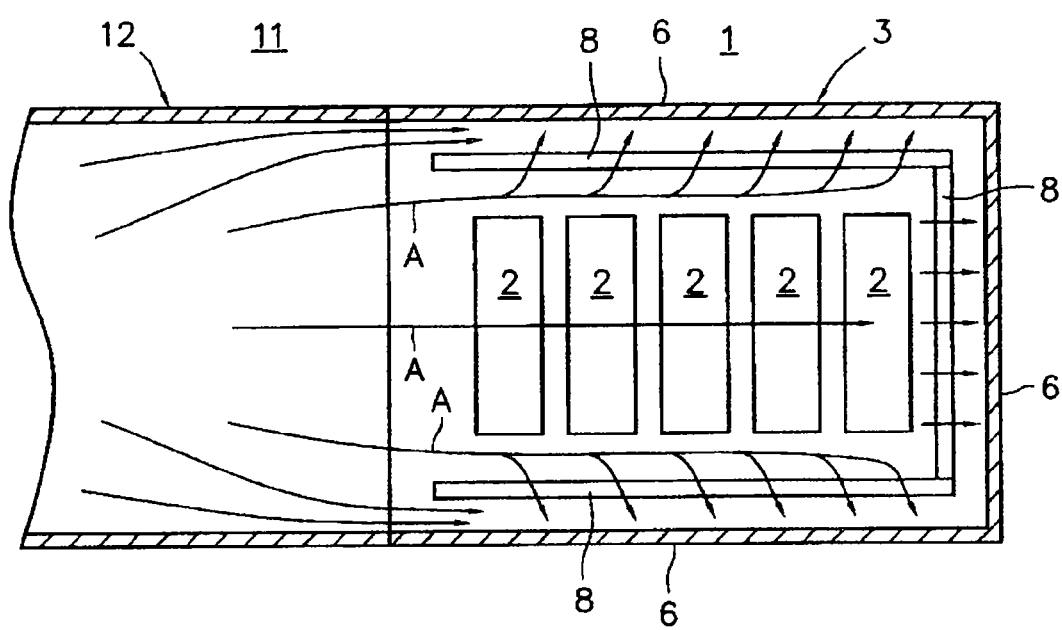
FIG. 8 is a fragmentary view taken along the arrow in the direction X-X in FIG. 7.

FIG. 7 and FIG. 8 show a modified example of the apparatus shown in FIG. 6 as yet a further embodiment of the present invention. This example has a different configuration from FIG. 6 in that a radiant heat-receiving panel 8, that is the same as that shown in FIG. 2, is provided on an inner side of the three side walls 6 excluding the wall of the building 3 of the coil yard 1 connecting with the building 12 of the heat-rolling equipment 11.

Other aspects of the configuration are the same as those shown in FIG. 6 and the same reference numerals are assigned to the same members.

As a result, the present embodiment also obtains the same effect as the embodiment shown in FIG. 6. Furthermore in the building 3 of the coil yard 1, the radiant heat-receiving panels 8 that are disposed on an inner side of the three side walls 6 are heated by absorption of the radiant heat of the hot-rolled coils 2 to thereby enable production of convection heat into the air from each radiant heat-receiving panel 8. In this manner, since heating of the air in the building 3 can be executed more efficiently and the strength of the ascending airflow produced in the building 3 of the coil yard 1 can be increased, the power generation amount can be further increased.

The present invention is not limited to the configuration in each of the above embodiments, and to the extent that the power generating turbine 5 can be driven by the ascending airflow passing through the cylindrical portion 4a of the chimney 4, the height at which the power generating turbine 5 is disposed in the cylindrical portion 4a of the chimney 4 may be suitably varied.

In the embodiment shown in FIG. 6 or the embodiment shown in FIG. 7 and FIG. 8, a radiant heat-receiving panel 8 may be disposed in the same manner as shown in FIG. 3 at a position that does not cause interference with the stored hot-rolled coils 2 or when the hot-rolled coils 2 are conveyed in an upper portion of the building 3 of the coil yard 1. In this manner, since the air in the building 3 is more efficiently heated and the strength of the ascending airflow in the building 3 of the coil yard 1 is further increased, the power generation amount can be further increased.

In the embodiment shown in FIG. 2, the embodiment shown in FIG. 3, the embodiment shown in FIG. 6, and the embodiment shown in FIG. 7 and FIG. 8, a gridiron type member 9 that is the same as that shown in FIG. 4 may be provided on the floor portion of the building 3 of the coil yard 1. In this manner, it is possible to pass air through the lower side of each hot-rolled coil 2 and to promote transmission of convection heat into the air in the building 3 resulting from heat retained in each hot-rolled coils 2. Thus air in the building 3 is more efficiently heated, the strength of the ascending airflow produced in the building 3 of the coil yard 1 can be further strengthened thereby enabling a further increase to the power generation amount.

In the embodiment shown in FIG. 2, the embodiment shown in FIG. 3, the embodiment shown in FIG. 4, and the embodiment shown in FIG. 7 and FIG. 8, an insulating member 10 having high-temperature resistant properties in the same manner as that shown in FIG. 5 can be arranged on the inner bottom portion of the building 3 of the coil yard 1. In this manner, since it is possible to suppress the dissipation of heat from the bottom portion of the building 3 of the coil yard 1 into the ground surface, the available heat amount for heating the air in the building 3 can be increased and the heating efficiency for air in the building 3 can be increased. Thus a further increase in the power generation amount is enabled as a result of increasing the strength of the ascending airflow that is produced in the building 3.

Figure 9:
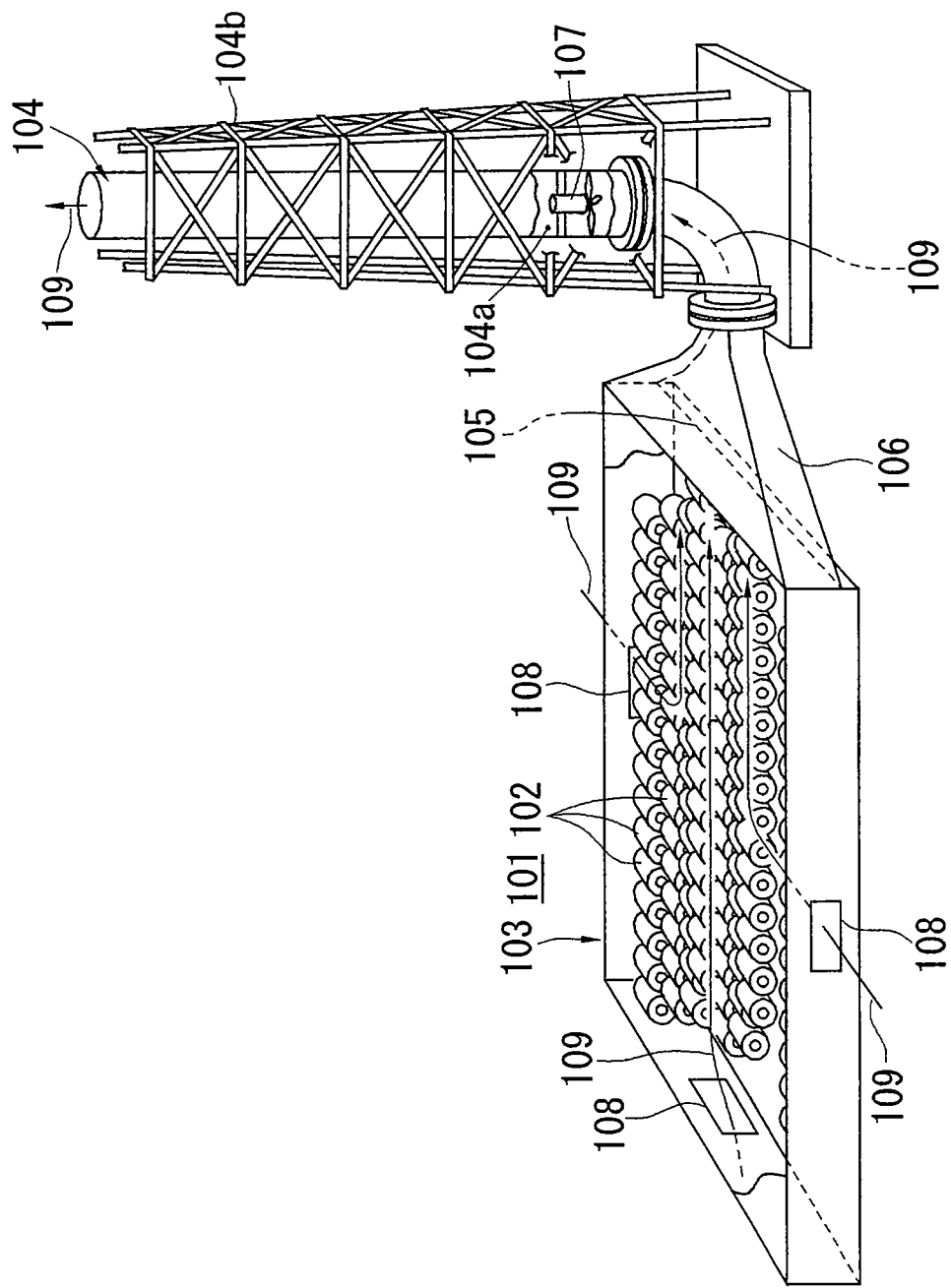
FIG. 9 is a schematic perspective view showing an application of a high-temperature heat radiator storage yard generating apparatus to a coil yard as yet a further embodiment of the present invention.

FIG. 9 shows another embodiment of a high-temperature heat radiating body storage yard power generation apparatus according to the present invention which is applied to a coil yard 101 which acts as a high-temperature heat radiator storage yard for the temporary storage of a hot-rolled coil 102 which is an intermediate iron and steel product acting as a high-temperature heat radiator that is manufactured using the hot-rolling equipment of an integrated iron and steel mill or the like, and the configuration thereof will be described below.

An air discharge tower 104 which is provided with a funnel-shaped air passage 104a extending vertically in predetermined dimensions within the tower at a predetermined allotment separated by a predetermined distance from a coil yard building 103 on an outer side of the coil yard building 103 configured for temporary storage of hot-rolled coils 102 manufactured by introducing heat by hot-rolling equipment prior to transfer to a subsequent processing step is constructed separately to a building 103.

Furthermore a discharge port 105 is provided in proximity to an upper portion of a side wall of the building 103 and a connecting duct 106 connects a lower position of the funnel-shaped air passage 104a of the air discharge tower 104 with the discharge port 105. Furthermore a power generating turbine 107 is disposed at a predetermined position in a vertical direction of the air discharge tower 104.

On the side walls of the building 103, an intake duct 108 is provided in a predetermined position on each side wall except for the side wall in which the discharge port 105 provides a connection to the connecting duct 106.

Additionally, an import conveying port and an export conveying port for hot-rolled coils 102 in the coil yard building 103 are provided in a predetermined side wall of the coil yard building 103 and an opening and closing door may be provided. Additionally, an intake duct that is the same as the intake duct 108 may also be provided in the lower portion of the door of the import conveying port and the export conveying port.

Furthermore a conveying means (not shown) for the hot-rolled coils 102 may be provided in the building 103.

The entire peripheral surface of the connecting duct 106 is provided with an insulating member (not shown) and air 109 discharged from the discharge port 105 of the building 103 is introduced into the air discharge tower 104 while preventing a reduction in temperature, and thereby maintains the temperature of the air 109 passing through the inner portion of the air discharge tower 104 as much as possible. Reference numeral 104b denotes a support structure of the air discharge tower 104.

The hot-rolled coil 102 that is manufactured by a hot-rolling process by introduction of heat by hot-rolling equipment (not shown) is imported by an import conveying port (not shown) into the building 103 of the coil yard 101 provided with a high-temperature heat radiating body storage yard power generation apparatus as described above, and is temporarily accumulated and stored until transfer to a subsequent processing step. In this manner, the heat retained in each hot-rolled coil 102 in the coil yard building 103 undergoes heat transfer into the air 109 in the building 103 mainly due to convection heating, and thereby the air 109 in the building 103 is heated. The heated air 109 becomes buoyant due to a reduction in density, rises in the building 103 towards a discharge port 105 provided in an upper portion in proximity to one side wall of the building 103, is introduced from the discharge port 105 through the connecting duct 106 into a lower portion of the funnel-shaped air passage 104a of the air discharge tower 104 and rises through the funnel-shaped air passage 104a of the air discharge tower 104 to be released in an external portion by an upper end discharge port of the air discharge tower 104.

As described above, low-temperature external air is introduced into the building 103 through each air intake duct 108 that is provided in the side walls of the building 103 due to the air 109 heated inside the building 103 being introduced from the discharge port 105 through the connecting duct 106 into the air discharge tower 104. Thus a flow of air 109 is produced in the building 103 that passes through the building 103 from each intake port 108 in succession towards the discharge port 105 and the air 109 is successively heated by convection heating by the heat retained in the hot-rolled coils 102 in the period in which the air 109 passes through the building 103.

In this manner, since air 109 that is heated to become buoyant passes from the discharge port 105 of the building 103 through the connecting duct 106 in succession towards the air discharge tower 104, an ascending airflow of air 109 is produced that passes from the lower portion upwardly in the funnel-shaped air passage 104a of the air discharge tower 104. Thus the power generating turbine 107 provided in the air discharge tower 104 is driven by the ascending airflow to execute wind-power generation.

In this manner, in the high-temperature heat radiator storage yard generating apparatus according to the present invention, air 109 can be efficiently heated by heat retained in the hot-rolled coils 102 in a building 103 of a coil yard 101 that has a high heat density since high-temperature hot-rolled coils 102 immediately after manufacturing processes are accumulated and stored. Furthermore air 109 that is heated efficiently to produce a buoyancy by heat retained in the hot-rolled coils 102 passes from the discharge port 105 of the building 103 through connecting duct 106 and is introduced into an external air discharge tower 104 to thereby efficiently produce an ascending airflow in the air discharge tower 104. In this manner, efficient power generation can be executed by efficient driving of the power generating turbine 107 provided in the air discharge tower 104.

Since the air discharge tower 104 is provided on a separate allotment to the building 103 of the coil yard 101, construction work for the air discharge tower 104 requiring a number of days to construct the power generation apparatus for a high-temperature heat radiator storage yard according to the present invention can be performed without having any effect on the coil yard 101. Furthermore the work associated with providing the discharge port 105 or the intake duct 108 in the side wall of the building 103 of the coil yard can be executed without problems. Thus when the high-temperature heat radiator storage yard generating apparatus according to the present invention is provided in a coil yard 101 in an existing high-temperature heat radiator storage yard, a risk of impediment to the operation of the existing high-temperature heat radiator storage yard can be avoided and its operation can be continued.

Figure 10:
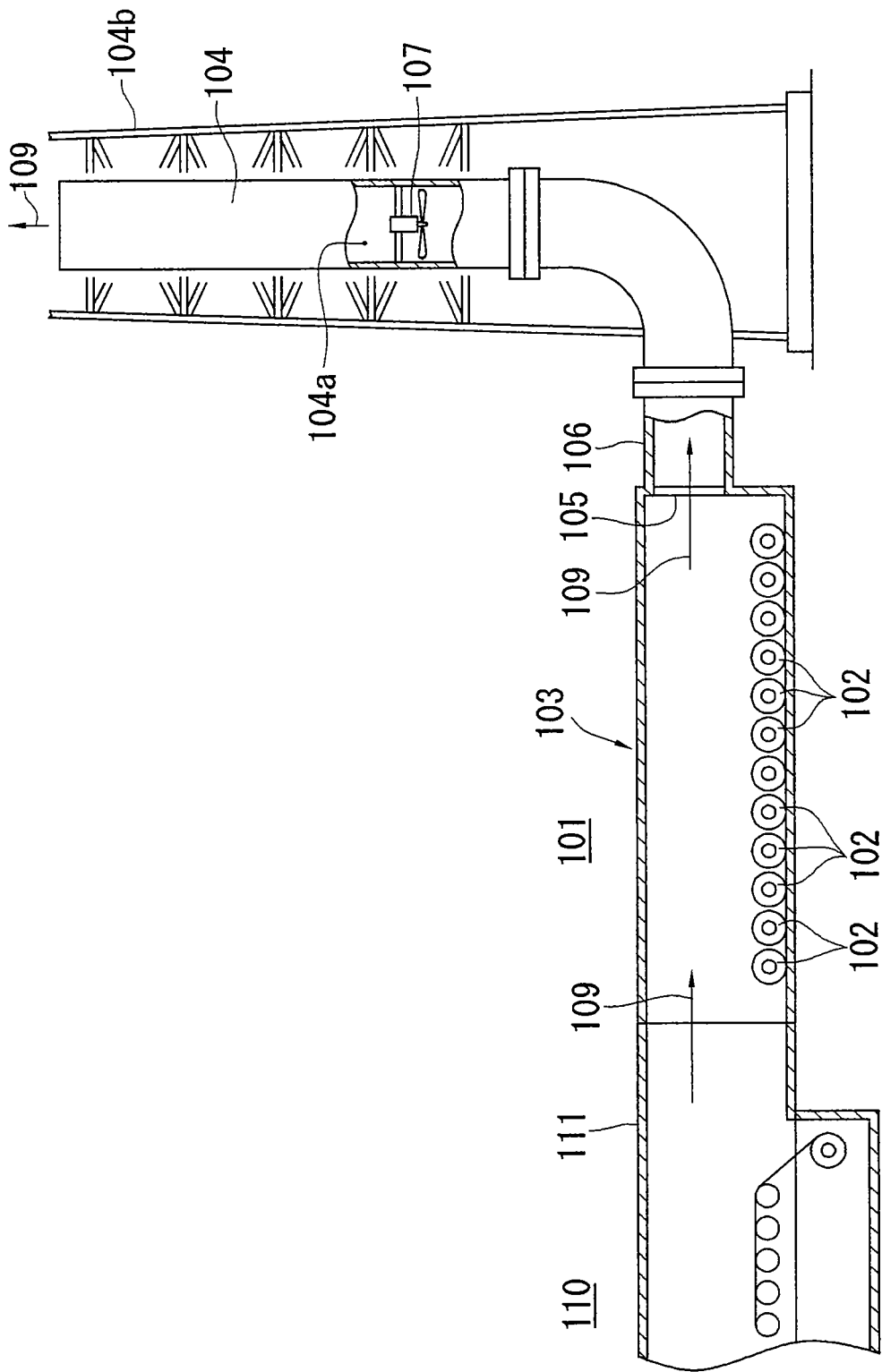
FIG. 10 is a schematic side view showing a modified example of the apparatus shown in FIG. 9 as yet a further embodiment of the present invention.

FIG. 10 shows a modified example of the apparatus shown in FIG. 9 as yet a further embodiment of the present invention. This example has a different configuration from FIG. 9 in that the opposite side wall from the side wall on which the discharge port 105 is provided in the building 103 of the coil yard 101 communicates with and is connected to the end portion on the extraction side for hot-rolled coils 102 in the building 111 of the hot-rolling equipment 110 that manufactures the hot-rolled coils 102 using a hot-rolling process by introduction of heat. The building 111 of the hot-rolling equipment 110 and the building 103 of the coil yard 101 are integrated.

In the building 103 of the coil yard 101, the intake duct 108 on the side walls is omitted to thereby enable air to be drawn from the building 111 of the hot-rolling equipment 110. Other aspects of the configuration are the same as those shown in FIG. 9 and the same reference numerals are assigned to the same members.

According to the present embodiment, when the hot-rolled coils 102 manufactured by the hot-rolling equipment 110 are imported into the building 103 of the coil yard 101 and temporarily stored until transfer to a subsequent process, in the same manner as the embodiment shown in FIG. 9, air in the building 103 is heated mainly by convection heating by heat retained in each hot-rolled coil 102 in the coil yard building 103. Thus the air 109 that is heated to a reduced density and becomes buoyant is introduced from the discharge port 105 of the building 103 through the connecting duct 106 into the discharge tower 104 to thereby produce an ascending airflow in the discharge tower 104.

When air in the building 103 of the coil yard 101 is introduced in the above manner from the discharge port 105 through the connecting duct 106 into the discharge tower 104, air that has already been heated in comparison with external air by heat radiated during the hot-rolling processing steps in the building 111 of the hot-rolling processing equipment 110 is introduced from the connection points of the building 103 with the building 111 for the hot-rolling equipment 110 into the building 103 of the coil yard 101. In this manner, the temperature of the air 109 that is heated by convection heat from the hot-rolled coils 102 in the building 103 of the coil yard 101 is further increased. Therefore since the temperature of the air 109 that is introduced from the discharge port 105 of the building 103 of the coil yard 101 through the connecting duct 106 into the discharge tower 104 can be further increased, the wind speed of the ascending airflow produced by the buoyancy of heated air in the discharge tower 104 can be increased and the power generation amount of the power generating turbine 107 can be increased.

Figure 11:
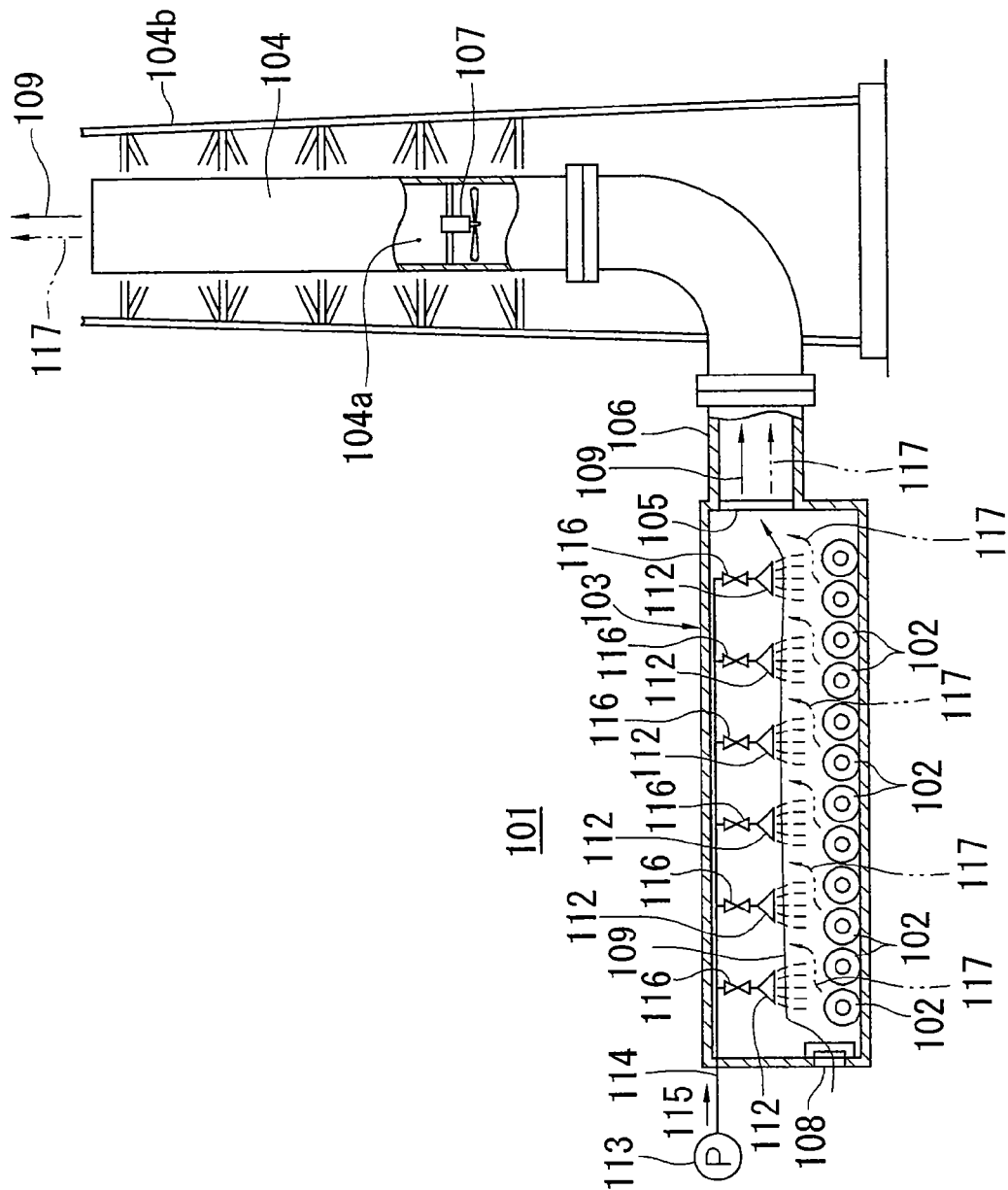
FIG. 11 is a schematic side view showing a modified example of the apparatus shown in FIG. 9 as yet a further embodiment of the present invention.

FIG. 11 shows a modified example of the apparatus shown in FIG. 9 as yet a further embodiment of the present invention. This example has a different configuration from FIG. 9 in that a plurality of water spraying nozzles 112 is provided on the ceiling portion in the building 103 of the coil yard 101 corresponding to the disposition of the hot-rolled coils 102 disposed in the building 103. Furthermore a water supply line 114 introducing water 115 from a water pump 113 in an external portion of the building is connected to each water spraying nozzle 112 and water 115 supplied from the water pump 113 through the water supply line 114 can be sprayed as a mist or as a shower from each water spraying nozzle 112 on the hot-rolled coils 102 that are stored in the building 103.

Furthermore a water supply valve 116 corresponding to each individual water spraying nozzle 112 is provided in the water supply line 114 connected to each water spraying nozzle 112 to thereby enable individual switching between spraying of water 115 from each water spraying nozzle 112 and stopping of spraying. In this manner, selective spraying of water 115 onto those groups of hot-rolled coils 102 of the respective hot-rolled coils 102 stored in the building 103 that are at a relatively high temperature is enabled by opening only the water supply valves 116 corresponding to the water spraying nozzles 112 that are disposed above a group of the relatively high-temperature hot-rolled coils 102 that have not spent much time in the yard after importing into the building 103.

The water 115 that is supplied to each water spraying nozzle 112 by the water pump 113 may be, for example, cold water that is heated (warmed) after being supplied for use in a cooling process during hot rolling by the hot-rolling equipment that manufactures the hot-rolled coils 102. In this manner, since the energy corresponding to the sensible heat required to heat the water 115 to an evaporation temperature can be reduced when the water 115 that is sprayed from the water spraying nozzles 112 is evaporated by heat retained in the hot-rolled coils 102, a useful configuration is enabled in which the production efficiency for steam 117 by the heat retained in the hot-rolled coils 102 is increased.

Other aspects of the configuration are the same as those shown in FIG. 9 and the same reference numerals are assigned to the same members.

According to the present embodiment, in the same manner as the apparatus shown in FIG. 9, air heated in the building 103 of the coil yard 101 that stores the hot-rolled coils 102 by convection heating by heat retained in each stored hot-rolled coil 102 is introduced from the discharge port 105 of the building 103 through the connecting duct 106 into the discharge tower 104.

Of the hot-rolled coils 102 stored in the building 103, when the water supply valve 116 is opened corresponding to each water spraying nozzle 112 disposed above a group of the relatively high-temperature hot-rolled coils 102, the water 115 that is supplied from the water pump 113 through the water supply line 114 is sprayed as a mist or as a shower towards the group of the relatively high-temperature hot-rolled coils 102. Thus a part of the water drops in the water 115 that is sprayed towards a group of the relatively high-temperature hot-rolled coils 102 are heated and evaporated midway during descending by contact with the air 9 that is heated by the convection heat of heat retained in the hot-rolled coils 102. Furthermore the remaining water drops that are sprayed fall onto the group of the relatively high-temperature hot-rolled coils 102, and the water drops that come into contact with each hot-rolled coil 102 are directly heated and evaporate due to heat retained in each hot-rolled coil 102.

When the water 115 that is sprayed onto a group of the relatively high-temperature hot-rolled coils 102 by each water spraying nozzle 112 is heated directly by heat retained in the group of the hot-rolled coils 102, or indirectly by the heated air 109, and evaporates to form steam 117, the volume expands by one thousand and several hundred times. Thus the amount of heated gas is greatly increased by the addition of the large amount of steam 117 produced by evaporating water 115 sprayed from each water spraying nozzle 112 into the air 109 that is heated by the convection heating with the hot-rolled coils 102 in the building 103.

Thus when the steam 117 mixed with the heated air 109 displaces from the discharge port 105 of the building 103 through the connecting duct 106 towards the discharge tower 104, the speed of the airflow ascending in the funnel-shaped air passage 104a in the discharge tower 104 can be increased and therefore the power generating turbine 107 provided in the discharge tower 104 is driven by the accelerated ascending airflow to execute wind-power generation.

Consequently, according to the present embodiment, in addition to obtaining the same effect as the apparatus in FIG. 9, the large amount of steam 117 is produced by evaporation of the water 115 sprayed from the water spraying nozzles 112 using heat retained in the hot-rolled coils 102. The large amount of steam 117 is also introduced into the discharge tower 104 to thereby enable a radical increase in the wind speed of the air ascending through the discharge tower 104. In this manner, the energy that is recoverable by the power generating turbine 107 can be increased and the output of the power generating turbine 107 can be markedly increased.

When newly manufactured hot-rolled coils 102 having a large heat retention amount are successively imported into the coil yard 101, the earliest imported coil of the hot-rolled coils 102 that are already stored in the coil yard 101, that is to say, the hot-rolled coil 102 with the lowest temperature as a result of dissipating heat for the longest period is exported in that sequence through the export conveying port (not shown). Consequently when a hot-rolled coil 102 having a large heat retention amount is newly imported into the building 103 of the coil yard 101, the water supply valve 116, of those water supply valves 116 provided for each of the water spraying nozzles 112, that corresponds to the water spraying nozzle 112 positioned above the newly imported hot-rolled coil 102 is opened, and a spray of water may be commenced onto the hot-rolled coil 102 having a large heat retention amount that has been newly imported into the building 103.

On the other hand, the water supply valve 116 is stopped that corresponds to the water spraying nozzle 112 positioned above the hot-rolled coil 102, of those hot-rolled coils 102 that are already stored in the coil yard 101, with a temperature that has fallen to a level at which the sprayed water 115 cannot be sufficiently evaporated.

When operational personnel enter the building 103 of the coil yard 101 to convey the hot-rolled coils 102 or the like, spraying of the water 115 from the water spraying nozzles 112 may be stopped.

Furthermore the present invention is not limited to each of the embodiments above, and the discharge port 105 of the building 103 of the coil yard 101 may be provided at a predetermined position on the ceiling portion of the building 103 rather than at a position proximate to an upper portion of the side wall, and the discharge port 105 provided on the ceiling portion of the building 103 may be connected through the connecting duct 106 with the lower portion of the discharge tower 104.

To the extent that the power generating turbine 107 is driven by the ascending airflow passing through the discharge tower 104, the height at which the power generating turbine 107 is disposed in the discharge tower 104 may be suitably varied. Furthermore in substitution for the discharge tower 104, the power generating turbine 107 may be provided in the connecting duct 106. In this case, a cylindrical passage corresponding to the diameter of the power generating turbine 107 may be formed on the connecting duct 106, and the power generating turbine 107 may be mounted in a portion of the cylindrical passage.

Since the existing funnel for air discharge equipment is used as an air discharge tower 104, construction works for the air discharge tower 104 can be omitted thereby facilitating creation of a high-temperature heat radiator storage yard generating apparatus according to the present invention. Furthermore in this case, when the flow amount, flow speed, the pressure and the like of the discharge air discharged through the funnel via the existing discharge equipment is considered, connection positions corresponding to the funnel in the end portion towards the lower flow in the connecting duct mounted in the discharge port 105 of the building that houses the coil yard 101 may be suitably provided so that the discharge air flowing through the funnel does not undergo reverse flow toward the building 103 of the coil yard 101.

In the embodiment shown in FIG. 11, although water supply valves 116 that can switch independently between water spraying from each water spraying nozzle 112 and terminating spraying are respectively provided for each water spraying nozzle 112 provided in the ceiling portion in the building 103 of the coil yard 101, one water supply valve 116 may be provided for each of a plurality of water spraying nozzles 112 provided within a certain range in the building 103. Furthermore when the position into which the newly manufactured hot-rolled coil 102 with a large heat amount is determined in the building 103 of the coil yard 101, a water spraying nozzle 112 may be provided only above the position to which the newly manufactured hot-rolled coil 102 with a large heat amount is imported.

The configuration of the embodiment above may be modified by a configuration in which a member is provided to increase the heating efficiency of air in the building 103 using heat retained in the hot-rolled coil 102 stored in the building 103. For example, a gridiron type member (not shown) to allow passage of air to a lower side of each hot-rolled coil 102 is provided on a floor portion of the building 103 of the coil yard 101 and the hot-rolled coils 102 imported into the coil yard 101 are placed on an upper side of the gridiron type member. In addition the configuration may be modified by a configuration in which an insulating member having high-temperature resistant properties is arranged to suppress dissipation of heat to the ground surface from the bottom portion of the building 103 of the coil yard 101.

Next, FIGS. 12A and 12B to FIGS. 14A and 14B show yet a further embodiment of the present invention applied to a coil yard 201 that is an example of a high-temperature heat radiator storage yard for temporary storage of a hot-rolled coil 202 which is an intermediate iron and steel product acting as a high-temperature heat radiator that is manufactured using the hot-rolling equipment of an integrated iron and steel mill or the like, and the configuration thereof will be described below.

A lower end portion of a cylindrical air discharge tower 204 extending vertically and provided on an upper side of a building 203 communicates with and is connected near to a central portion of the ceiling of the coil yard building 203 that temporarily stores and accumulates hot-rolled coils 202 manufactured by introduction of heat by hot-rolling equipment until transfer to a subsequent processing step. A power generating turbine 205 is provided at a predetermined position in a vertical direction in the air discharge tower 204 so that the ceiling surface of the coil yard building 203 is smoothly connected to the inner side of the air discharge tower 204 by forming a lower end portion 204a of the air discharge tower 204 in the shape of a flare.

Figure 12A:
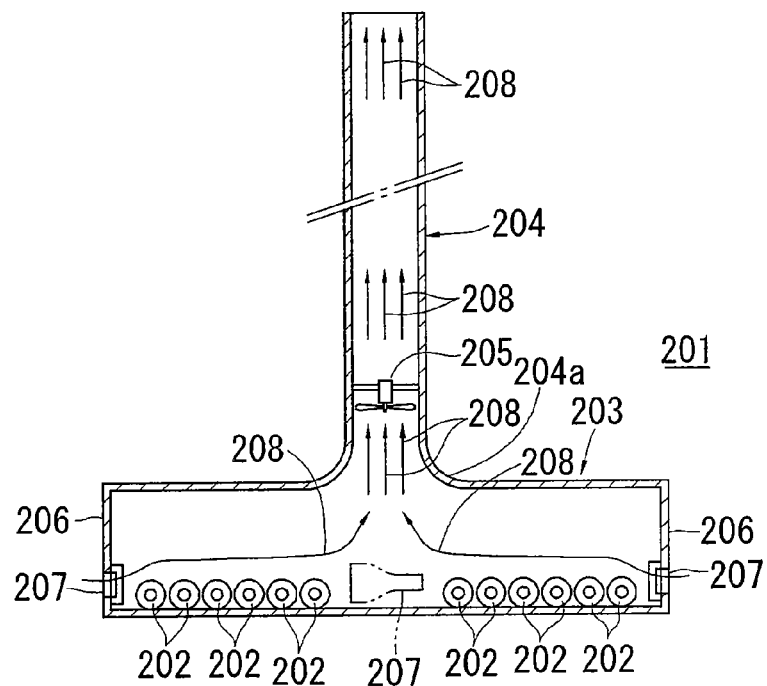
FIG. 12A is a schematic side view showing an application of a high-temperature heat radiator storage yard generating apparatus to a coil yard as yet a further embodiment of the present invention.
Figure 12B:
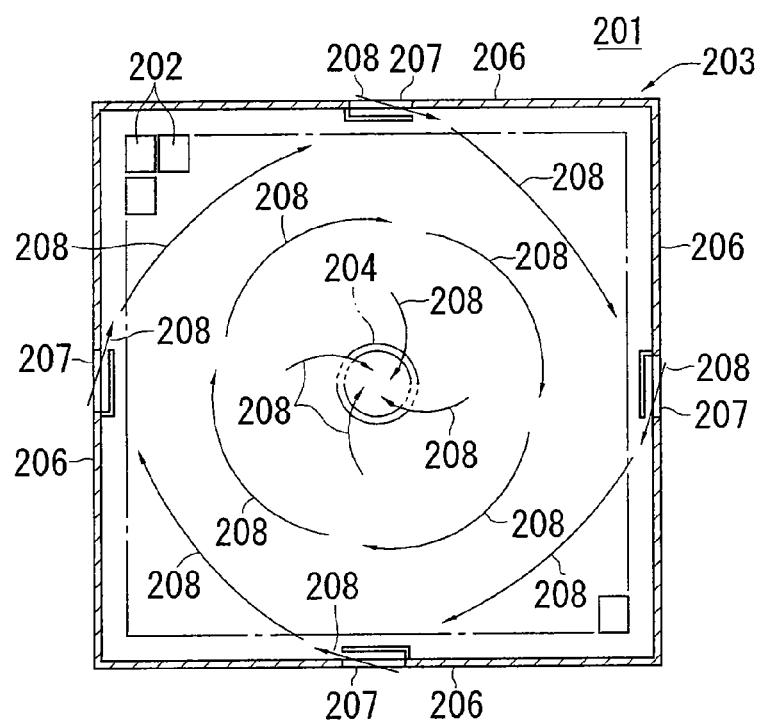
FIG. 12B is a schematic plan view showing the flow of air in the building of FIG. 12A.

Furthermore air ducts 207 enabling inflow of air (external air) 208 in a horizontal direction along an inner face of each side wall 206 are provided at a plurality of predetermined positions on a lower portion on the four side walls 206 forming the peripheral walls of the building 203 so that the inflow direction of air 208 inflowing in a horizontal direction into the building 203 through each air duct 207 meets at either one of a clockwise or a counterclockwise air circulation direction when viewed in plan, for example, as shown in FIG. 12B, in which all inflow directions of the air 208 passing through each air duct 207 meet in a clockwise direction when viewed on a plane.

Figure 13A:
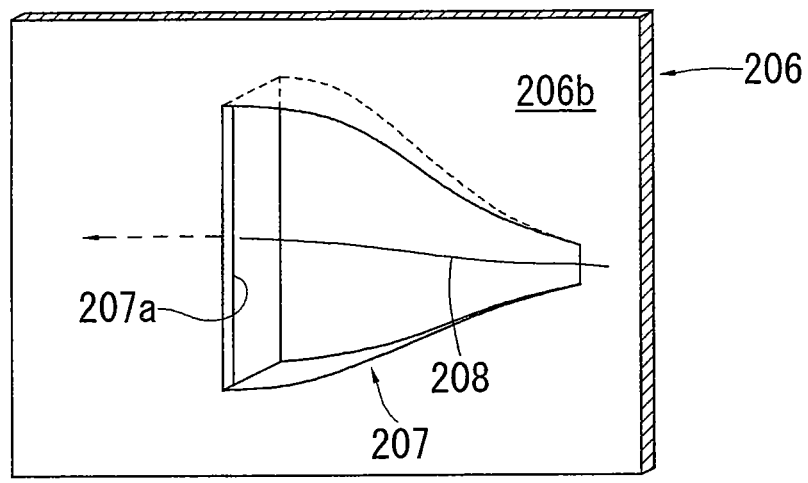
FIG. 13A is a schematic perspective view from an outer side of a building showing an example of an air duct for the apparatus shown in FIG. 12A.
Figure 13B:
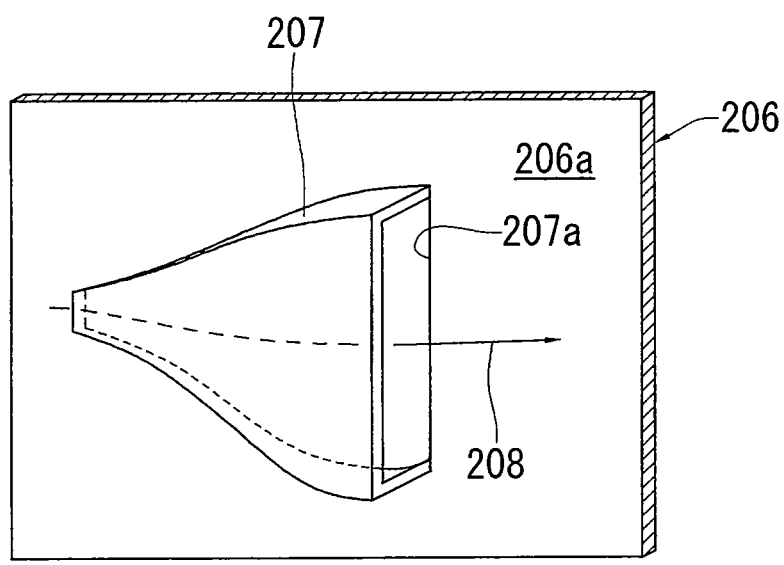
FIG. 13B is a schematic perspective view from an inner side of a building showing an example of an air duct for the apparatus shown in FIG. 12A.
Figure 14A:
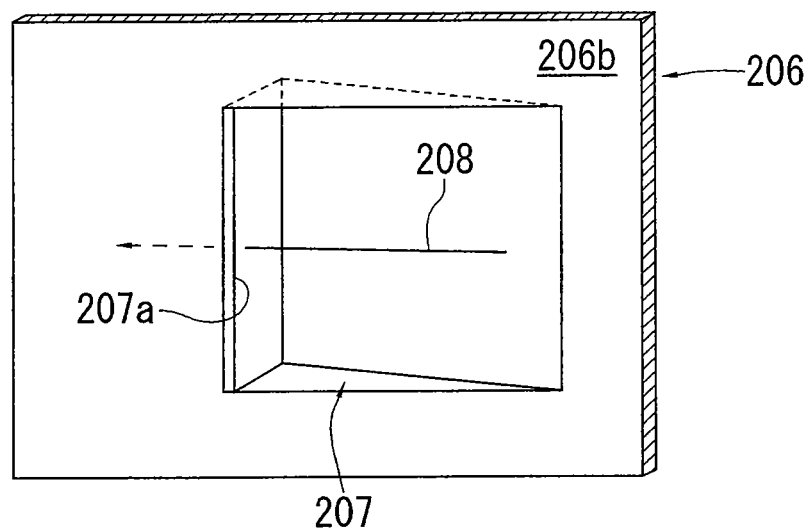
FIG. 14A is a schematic perspective view from an outer side of a building showing another example of an air duct for the apparatus shown in FIG. 12A.
Figure 14B:
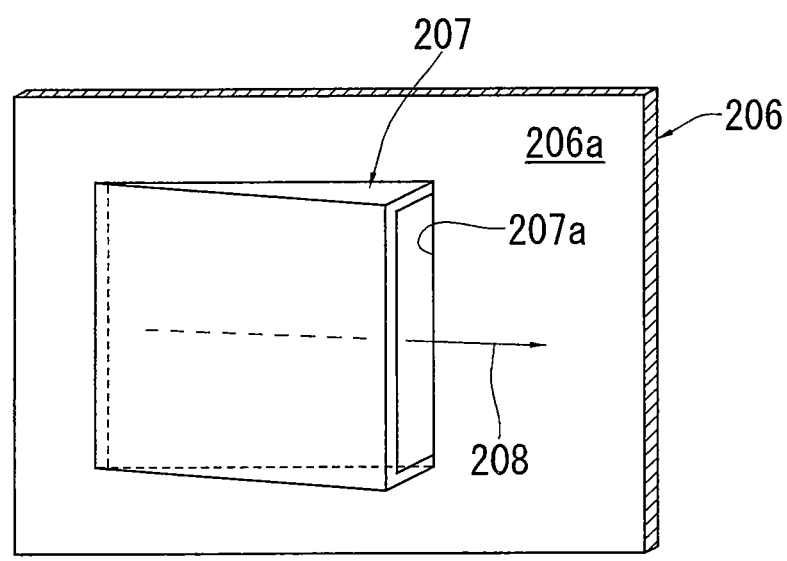
FIG. 14B is a schematic perspective view from an inner side of a building showing another example of an air duct for the apparatus shown in FIG. 12A.

More specifically, for example as shown in FIG. 13A and FIG. 13B, the air duct 7 is formed as a NACA-type duct in which an opening 207a connected into the building 203 and extending with a predetermined dimension in a horizontal direction is configured as a rectangular opening 207a extending vertically along an inner surface of the building side wall 206. As shown in FIG. 14A and FIG. 14B, the air duct 207 may be formed as a two-dimensional lamp-type duct in which the opening 207a connected into the building 203 and extending with a predetermined dimension in a horizontal direction is configured as a rectangular opening 207a extending vertically along an inner surface of the building side wall 206. In this manner, the flow of the air 208 in a horizontal direction along the inner wall 206a of the side wall 206 can be efficiently produced inside the building 203 by the input of the air 208 into the building 203 from an external portion of the building through the air duct 207. Furthermore the reference numeral 206b shown in FIG. 13A and FIG. 13B, and FIG. 14A and FIG. 14B denotes the outer surface of the side wall 206.

The size of the air duct 207 may be suitably set considering the scale of the coil yard building 203, the height of the discharge tower 204 and the number of hot-rolled coils 202 normally stored in the building 203 so that the inflow air amount is balanced by the air discharge amount from the building 203 to an external portion when the air in the building 203 is heated by the conductive heating of heat retained in the hot-rolled coils 202 stored in the building 203, rises in the air discharge tower 204 and is discharged to an external portion from an upper end port of the discharge tower 204. Furthermore the number of air ducts 207 may also be suitably modified so that the air inflow amount balances the air discharge amount from within the building 203 to an external portion.

The import conveying port and the export conveying port for hot-rolled coils 202 in the coil yard building 203 (not shown) may be provided in a predetermined side wall 206 of the coil yard building 203 and may be provided with an opening and closing door. Further, an air duct that is the same as the air duct 207 may also be provided in a lower portion of the door of the import conveying port and the export conveying port.

Furthermore a conveying means (not shown) for the hot-rolled coils 202 may be provided in the building 203.

The hot-rolled coil 202 that is manufactured by a hot-rolling process causing introduction of heat from hot-rolling equipment (not shown) is imported by an import conveying port (not shown) into the building 203 of the coil yard 201 provided with a high-temperature heat radiator storage yard generating apparatus as described above, and is temporarily accumulated and stored until transfer to a subsequent processing step. In this manner, the heat retained in each hot-rolled coil 202 in the coil yard building 203 undergoes heat transfer into the air 208 in the building 203 mainly due to convection heating, and thereby the air 208 in the building 203 is heated. The heated air 208 undergoes a reduction in density and displaces towards the air discharge tower 204 in the ceiling portion by ascending in the building 203 due to the resulting buoyancy. After passing through the air discharge tower 204, the heated air 208 is released into an external portion by an upper end discharge port.

Consequently, low-temperature external air is introduced into the building 203 through each air duct 207 that is provided in a lower portion of the four wall walls 206 in the building 203 due to the air 208 in the building 203 ascending towards the air discharge tower 204. At this time, the flow of the air 208 introduced into an inner portion of the building 203 through each air duct 207 from an external portion of the building 203 flows along the inner surface 206a of the side wall 206 of the building 203. Furthermore all the directions of flow of air 208 meet in a clockwise direction when viewed on a plane and therefore the flow of air 208 inflowing into an inner portion of the building 203 through each air duct 207 is formed mainly by a horizontal component that facilitates flow along the outer periphery of the building 203. Consequently, a revolving flow of the air 208 that displays a low level of vertical components can be produced in the entire building 203 as shown by FIG. 12B by the inertia of the flow of the air 208 inflowing through each air duct 207.

Since the flow of the air 208 forming a revolving flow in the building 203 displays a low level of vertical components, the time required to reach the air discharge tower 204 provided near to the center of the ceiling portion of the building 203 is lengthened. In this manner, since the heat exchange time for convection heat with each hot-rolled coil 202 spread out on the large surface area in the coil yard building 203 is increased, the temperature increase in the air 208 that is heated by convection heating from each hot-rolled coil 202 is further increased.

In this manner, since the density of the air 208 in the building 203 can be reduced to thereby increase the buoyancy, the flow amount of air 208 can be increased by buoyant air 208 in the building 203 being introduced into the air discharge tower 204 and ascending therein. Consequently, driving of the power generating turbine 205 provided in the air discharge tower 204 can be performed by the ascending airflow of air 208 that displays an increased flow amount to thereby execute power generation.

In this manner, according to the a high-temperature heat radiator storage yard generating apparatus of the present invention, a revolving flow of the air 208 that displays low vertical components can be produced in the building 203 of the coil yard 201 that displays an elevated heat density by accumulating and storing the hot-rolled coils 202 that have a high temperature immediately after manufacture. Furthermore the heat exchange time of each hot-rolled coil 202 with the air 208 in the building 203 can be increased. In this manner, in comparison to a configuration in which an opening is provided in a side wall 206 of the coil yard building 203 to simply introduce external air, the air 208 in the building 203 is heated more efficiently and air heated to produce a higher buoyancy can be introduced into the air discharge tower 204. Consequently, the airflow amount ascending in an inner portion of the air discharge tower 204 can be increased, the energy that is recoverable by the power generating turbine 205 can be increased, and therefore the output of the power generating turbine 205 can be increased.

Therefore it is possible to shorten the period of time required to recover initial costs associated with installation of a high-temperature heat radiator storage yard generating apparatus according to the present invention in a building 203 for the coil yard 201.

Figure 15A:
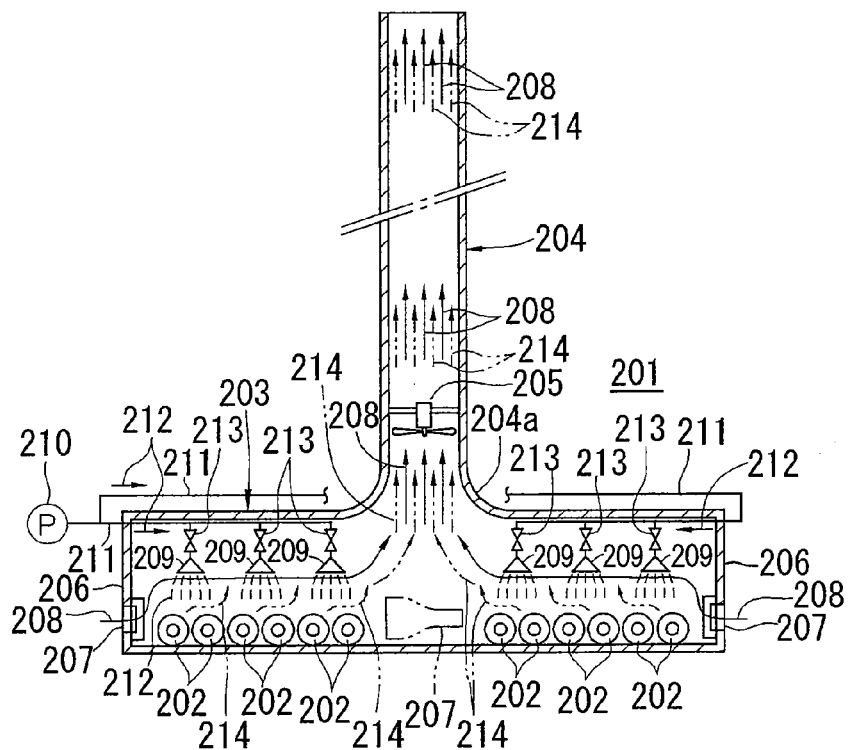
FIG. 15A is a schematic sectional side view showing a modified example of the apparatus shown in FIG. 12A and FIG. 12B to FIG. 14A and FIG. 14B as yet a further embodiment of the present invention.
Figure 15B:
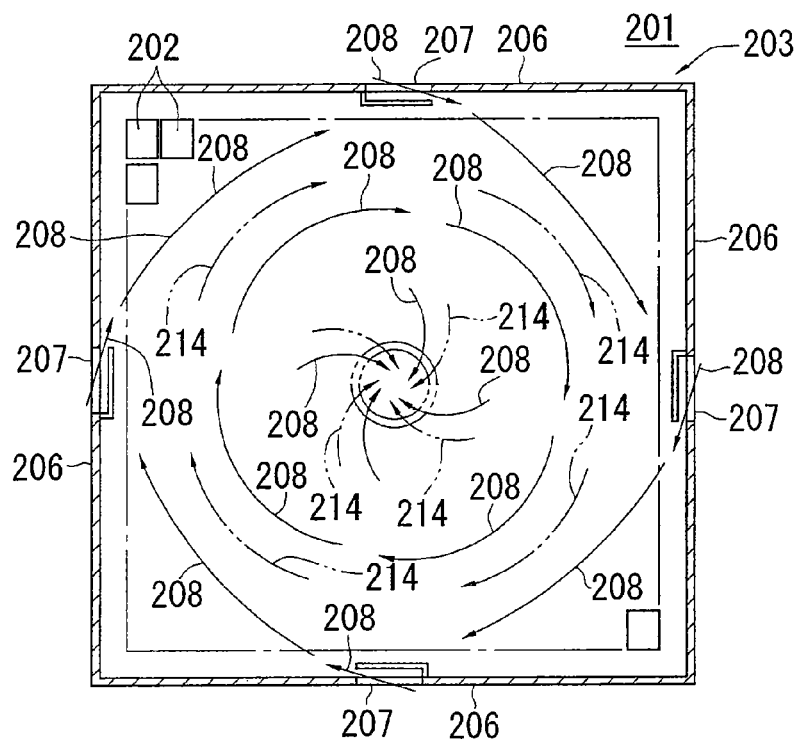
FIG. 15B is a schematic plan view showing the flow of air in the building shown in FIG. 15A.

FIG. 15A and FIG. 15B shows a modified example of the apparatus shown in FIG. 12A and FIG. 12B to FIG. 14A and FIG. 14B as yet another embodiment of the present invention. In this example, in a modification of the configuration shown in FIG. 12A and FIG. 12B to FIG. 14A and FIG. 14B, a plurality of water spraying nozzles 209 corresponding to the disposition of the hot-rolled coils 202 disposed in the building 203 is provided on a ceiling portion in the building 203.

Furthermore a water supply line 211 introducing water 212 from a water pump 210 in an external portion of the building is respectively connected to each water spraying nozzle 209, and the water 212 supplied through the water supply line 211 from the water pump 210 is sprayed as a mist or as a shower onto the hot-rolled coils 202 stored in the building 203 from each water spraying nozzle 209.

Furthermore a water supply valve 213 corresponding to each individual water spraying nozzle 209 is provided on the water supply line 211 connected to each water spraying nozzle 209 to thereby enable individual switching between spraying of water 212 from each water spraying nozzle 209, and stopping of spraying. In this manner, selective spraying of water 212 onto those groups of hot-rolled coils 202 of the respective hot-rolled coils 202 stored in the building 203 that are at a relatively high temperature is enabled by opening only the water supply valves 213 corresponding to the water spraying nozzle 209 that is disposed above a group of the relatively high-temperature hot-rolled coils 202 that have not spent much time in the yard after importing into the building 203.

The water 212 that is supplied to each water spraying nozzle 209 by the water pump 210 may be, for example, cold water that is heated (warmed) after being supplied for use in a cooling process during hot rolling by the hot-rolling equipment (not shown) that manufactures the hot-rolled coils 202. In this manner, since the energy corresponding to the sensible heat required to heat the water 212 to an evaporation temperature can be reduced when the water 212 that is sprayed from the water spraying nozzles 209 is evaporated by heat retained in the hot-rolled coils 202, a useful configuration is enabled in which the production efficiency for steam 214 by the heat retained in the hot-rolled coils 202 is increased.

Other aspects of the configuration are the same as those shown in FIG. 12A and FIG. 12B to FIG. 14A and FIG. 14B and the same reference numerals are assigned to the same members.

According to the present embodiment, in the same manner as in the embodiments above, the air 208 flows into the building 203 though each air duct 207 provided in the four side walls 206 of the building 203 of the coil yard 201 that stores the hot-rolled coils 202 to thereby produce a flow of air 208 that revolves in the building 203 while displaying low levels of vertical components.

When the water supply valve 213 is opened corresponding to each water spraying nozzle 209 disposed above a group of the relatively high-temperature hot-rolled coils 202 of the hot-rolled coils 202 stored in the building 203, the water 212 that is supplied from the water pump 210 through the water supply line 211 is sprayed as a mist or as a shower towards the group of the relatively high-temperature hot-rolled coils 202. Thus a part of the water drops in the water 212 sprayed towards a group of the relatively high-temperature hot-rolled coils 202 becomes heated and evaporated midway during descending by contact with the air 208 that is heated by the convection heat of the heat retained in the hot-rolled coils 202. Furthermore the remaining water drops that are sprayed fall onto the group of the relatively high-temperature hot-rolled coils 202, and the water drops that come into contact with each hot-rolled coil 202 are directly heated and evaporate due to heat retained in each hot-rolled coil 202.

When the water 212 sprayed onto a group of the relatively high-temperature hot-rolled coils 202 by each water spraying nozzle 209 is heated directly by heat retained in the group of the hot-rolled coils 202, or indirectly by the heated air 208, and evaporates to form steam 214, the volume expands by one thousand and several hundred times. Thus the amount of heated gases in the building 203 can be greatly increased by adding the large amount of the steam 214 produced by evaporating the water 212 sprayed from each water spraying nozzle 209 into the air 208 that is heated by the convection heating with the hot-rolled coils 202.

Thus since the steam 214 mixed with a revolving flow of the heated air 208 displaces towards the air discharge tower 204 provided near to the center of a ceiling portion of the building 203 and passes through an inner portion of the air discharge tower 204, and then is discharged to an external portion through an upper end discharge port, the speed of the airflow ascending in the air discharge tower 204 can be increased. Therefore the power generating turbine 205 provided in the discharge tower 204 is driven by the accelerated ascending airflow to execute wind-power generation.

Consequently, according to the present embodiment, in addition to obtaining the same effect as in the above embodiments, a large amount of the steam 214 is produced by evaporation of the water 212 sprayed from the water spraying nozzles 209 using the heat retained in the hot-rolled coils 202. The large amount of the steam 214 is introduced into the discharge tower 204 to thereby enable a radical increase in the wind speed of the air ascending through the discharge tower 204. In this manner, the energy that is recoverable by the power generating turbine 205 can be increased and the output of the power generating turbine 205 can be markedly increased.

Therefore it is possible to shorten the period of time required to recover initial costs associated with installation of a high-temperature heat radiator storage yard generating apparatus according to the present invention in the building 203 for the coil yard 201.

Furthermore when the newly manufactured hot-rolled coils 202 that have a large heat retention amount are successively imported into the coil yard 201, the earliest imported coil of the hot-rolled coils 202 that are already stored in the coil yard 201, that is to say, the hot-rolled coil 202 with the lowest temperature as a result of dissipating heat for the longest period is exported in that sequence through the export conveying port (not shown). Consequently when the hot-rolled coil 202 that has a large heat retention amount is newly imported into the building 203 of the coil yard 201, the water supply valve 213 of the water supply valves 213 provided for each of the water spraying nozzles 209 that corresponds to the water spraying nozzle 209 positioned above the newly imported hot-rolled coil 202 is opened, and a spray of water may be commenced onto the hot-rolled coil 202 that has a large heat retention amount and has been newly imported into the building 203.

On the other hand, the water supply valve 213 that corresponds to the water spraying nozzle 209 positioned above the hot-rolled coil 202 of the hot-rolled coils 202 that are already stored in the coil yard 201 that has a temperature that has fallen to a level at which the sprayed water 212 cannot be sufficiently evaporated is closed.

When operational personnel enter the building 203 of the coil yard 201 to convey the hot-rolled coils 202 or the like, the spraying of water 212 from the water spraying nozzles 209 may be stopped.

Furthermore the present invention is not limited to each of the embodiments above. To the extent that the power generating turbine 205 is driven by the ascending airflow passing through the inner portion of the discharge tower 204, the height and position of the power generating turbine 205 in the discharge tower 204 may be suitably varied.

Although the air duct 207 provided in the side wall 206 of the building 203 of the coil yard 201 was exemplified by a NACA-type duct in FIG. 13A and FIG. 13B, and by a two-dimensional lamp-type duct in FIG. 14A and FIG. 14B, a configuration of the air duct 207 other than that shown in the figures may be used to the extent that a flow of the air 208 from outside the building 203 passes through the air duct 207 and flows into the building 203 to thereby create a flow of the air 208 in a horizontal direction along the inner surface 206a of the side wall 206 of the building 203.

The vertical or horizontal disposition of each of the air ducts 207 provided in a side wall 206 of the building 203 may be suitably varied in response to the shape and the like of the building 203.

In the embodiment shown in FIG. 15A and FIG. 15B, each water spraying valve 213 that individually switches between spraying and stopping spraying of the water 212 from each water spraying nozzle 209 is respectively disposed above each water spraying nozzle 209 provided on a ceiling portion in the building 203 of the coil yard 201. However one water spraying valve 213 may be provided for a plurality of water spraying nozzles 209 provided in a certain range in the building 203. Furthermore in the building 203 of the coil yard 201, when the position to which a newly manufactured hot-rolled coil 202 having a large heat retention amount is conveyed is determined, only the water spraying nozzle 209 above the position to which newly manufactured hot-rolled coil 202 having a large heat retention amount is conveyed sprays the water 212.

Furthermore a configuration may be added in which a member is provided to increase the heating efficiency of the air 208 in the building 203 using heat retained in the hot-rolled coil 202 stored in the building 203. For example, a gridiron type member (not shown) to allow passage of the air 208 to a lower side of each hot-rolled coil 202 may be provided on a floor portion of the building 203 of the coil yard 201 and the hot-rolled coils 202 imported into the coil yard 201 may be placed on an upper side of the gridiron type member. In addition, a configuration may be added in which an insulating member having high-temperature resistant properties is arranged on an inner bottom portion of the building 203 of the coil yard 201 to suppress dissipation of heat to the ground surface from the bottom portion of the building 203 of the coil yard 201.

Figure 16:
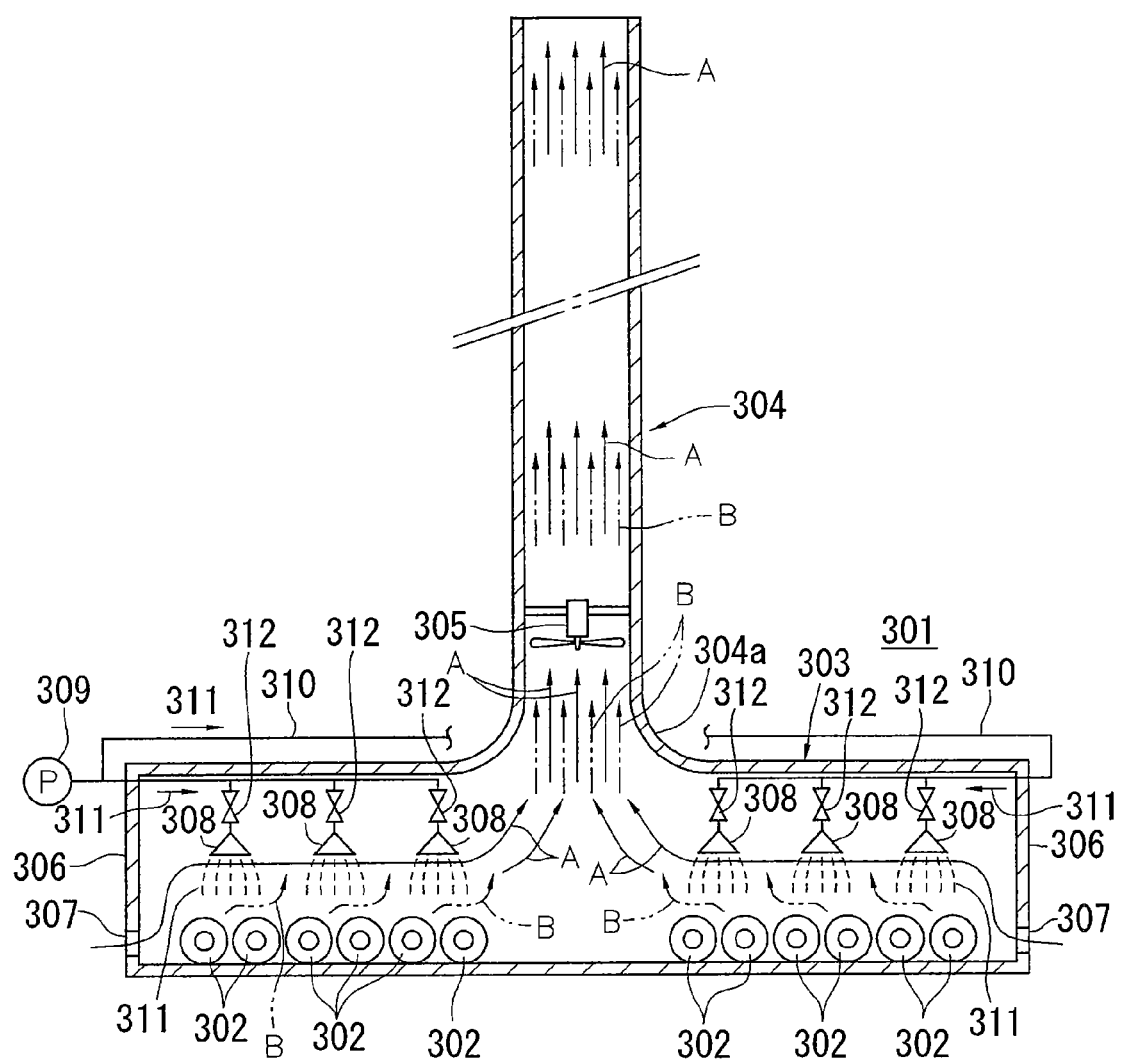
FIG. 16 is a schematic sectional side view showing an application of a high-temperature heat radiator storage yard generating apparatus to a coil yard as yet a further embodiment of the present invention.

Next, FIG. 16 shows yet a further embodiment of the present invention applied to a coil yard 301 which acts as a high-temperature heat radiator storage yard for temporary storage of a hot-rolled coil 302 which is an intermediate iron and steel product acting as a high-temperature heat radiator that is manufactured using the hot-rolling equipment of an integrated iron and steel mill or the like, and the configuration thereof will be described below.

A lower end portion of a cylindrical air discharge tower 304 extending vertically and provided on an upper side of a building 303 communicates with and is connected near to a central portion of the ceiling of the coil yard building 303 that temporarily stores and accumulates the hot-rolled coils 302 manufactured by introduction of heat by hot-rolling equipment until transfer to a subsequent processing step. At this time, a power generating turbine 305 is provided at a predetermined position in a vertical direction in the air discharge tower 304 so that the ceiling surface of the coil yard building 303 is smoothly connected to the inner side of the air discharge tower 304 by forming a lower end portion 304a of the air discharge tower 304 in the shape of a flare.

An intake duct 307 is provided in the lower end portion in the four side walls 306 of the building 303.

Furthermore, a plurality of water spraying nozzles 308 corresponding to the storage position of the hot-rolled coils 302 disposed in the building 303 is provided on a ceiling portion in the building 303. Furthermore a water supply line 310 introducing water 311 from a water pump 309 outside of the building is respectively connected to each of the water spraying nozzles 308, and the water 311 supplied through the water supply line 310 from the water pump 309 is sprayed from each water spraying nozzle 308 as a mist or as a shower onto the hot-rolled coils 302 stored in the building 303.

Furthermore a water supply valve 312 corresponding to each individual water spraying nozzle 308 is provided on the water supply line 310 connected to each of the water spraying nozzles 308 to thereby enable individual switching between spraying of water 311 from each water spraying nozzle 308, and stopping of spraying. In this manner, selective spraying of water 311 onto those groups of hot-rolled coils 302 of the respective relatively high-temperature hot-rolled coils 302 stored in the building 303 is enabled by opening only the water supply valves 312 corresponding to the water spraying nozzles 308 disposed above a group of the relatively high-temperature hot-rolled coils 302 that have not spent much time in the yard after importing into the building 303.

The water 311 that is supplied to each water spraying nozzle 308 by the water pump 309 may be, for example, cold water that is heated (warmed) after being supplied for use in a cooling process during hot rolling by the hot-rolling equipment (not shown). In this manner, since the energy corresponding to the sensible heat required to heat the water 311 to an evaporation temperature can be reduced when the water 311 that is sprayed from the water spraying nozzles 308 is evaporated by heat retained in the hot-rolled coils 302, a useful configuration is enabled in which the production efficiency of steam by the heat retained in the hot-rolled coils 302 is increased.

Although not shown in the figures, an export conveying port and an import conveying port of the hot-rolled coils 302 in the coil yard building 303 may be provided in a predetermined side wall 306 of the coil yard building 303 and may be provided with an opening and closing door. Furthermore an air intake duct similar to the air intake duct 307 above may be provided in a lower end portion of the door of the export conveying port and the import conveying port.

A conveying means (not shown) for the hot-rolled coils 302 may be provided in the building 303. In this case, the disposition of the conveying means (not shown) and each water spraying nozzle 308 and water supply line 310 may be determined to avoid interference.

The hot-rolled coil 302 that is manufactured by a hot-rolling process by introduction of heat from hot-rolling equipment (not shown) is imported by an import conveying port (not shown) into the building 303 of the coil yard 301 provided with a high-temperature heat radiator storage yard generating apparatus as described above, and is temporarily accumulated and stored until transfer to a subsequent processing step. In this manner, the heat retained in each hot-rolled coil 302 in the coil yard building 303 undergoes heat transfer into the air in the building 303 mainly due to convection heating, and thereby the air in the building 303 is heated. The heated air undergoes a reduction in density and displaces towards the discharge tower 304 in the ceiling portion by ascending in the building 303 due to the resulting buoyancy. After passing through the discharge tower 304, the air is released into an external portion through an upper end discharge port.

Low-temperature external air is introduced into the building 303 through an air intake duct 307 that is provided in a lower end portion of the four wall faces in the building 303 due to the air in the building 303 ascending towards the discharge tower 304. Thereafter, the air that has entered into the building 303 by the air intake duct 307 is successively heated by convection heating from the hot-rolled coils 302, and the air rises within the building 303 towards the discharge tower 304. Thus in the building 303 of the coil yard 301 as shown by the arrow A in FIG. 16, after ascending towards the discharge tower 304 through an inner portion of the building 303 from the intake duct 307 provided in the four side walls 306, an ascending airflow is produced that flows from a lower position upwardly in the discharge tower 304.

Of the hot-rolled coils 302 stored in the building 303, when the water supply valve 312 is opened corresponding to each water spraying nozzle 308 disposed above a group of the relatively high-temperature hot-rolled coils 302, the water 311 supplied from the water pump 309 through the water supply line 310 is sprayed as a mist or as a shower towards the group of the relatively high-temperature hot-rolled coils 302. Thus a part of the water drops in the water 311 sprayed towards a group of the relatively high-temperature hot-rolled coils 302 is heated and evaporated midway during descending by contact with the air that is heated by the convection heat of heat retained in the hot-rolled coils 302. The remaining water drops that are sprayed fall onto the group of the relatively high-temperature hot-rolled coils 302, and the water drops that come into contact with each hot-rolled coil 302 are directly heated and evaporate due to heat retained in each hot-rolled coil 302.

In this manner, in the building 303, when the water 311 that is sprayed onto a group of the relatively high-temperature hot-rolled coils 302 by water spraying nozzles 308 is directly heated by heat retained in the group of the hot-rolled coils 302, or indirectly heated by heated air, and evaporates to form steam, the volume expands by one thousand and several hundred times and produces a large amount of heated gas. Thus the steam formed from the large amount of heated gas produced in this manner undergoes a reduction in density and displaces towards the discharge tower 304 in the ceiling portion by ascending in the building 303 due to the resulting buoyancy as shown by the arrow B on the dotted line in FIG. 16 and becomes mixed with the airflow of heated air in the building 303. After passing through the discharge tower 304, the air is released into an external portion through an upper end discharge port.

In this manner, in the inner portion of the discharge tower 304, in addition to the ascending airflow (arrow A) of heated air, an ascending airflow of steam (arrow B) in the building 303 is produced to thereby increase the speed of the airflow that rises in the air discharge tower 304 and drive the power generating turbine 305 provided in the discharge tower 304 with the accelerated ascending airflow to thereby execute wind-power generation.

In this manner, according to the high-temperature heat radiator storage yard generating apparatus of the present invention, air can be more efficiently heated using heat retained in hot-rolled coils 302 in a building 303 of a coil yard 301 that is subjected to an increased heat density by accumulating and storing high-temperature hot-rolled coils 302 immediately after manufacture. Furthermore, since a large amount of steam can be produced by using the heat retained in the hot-rolled coils 302 to evaporate the water 311 sprayed from the water spraying nozzles 308, it is possible to introduce an ascending airflow of the large amount of steam produced in the building 303 into the discharge tower 304. In this manner, the wind speed of the airflow ascending inside the air discharge tower 304 is radically increased in comparison to the introduction of an ascending airflow which is heated by only the convection heating of the hot-rolled coils 302 in the building 303 to the discharge tower 304. Thereby the increase in the wind speed of the ascending airflow in the discharge tower 304 increases the energy that is recoverable by the power generating turbine 305 and thus enables a marked increase in the output of the power generating turbine 305.

Therefore it is possible to shorten the period of time required to recover initial costs associated with installation of a high-temperature heat radiator storage yard generating apparatus according to the present invention in a building 303 of a coil yard 301.

Furthermore when the newly manufactured hot-rolled coils 302 that have a large heat retention amount are successively imported into the coil yard 301, the earliest imported coil of the hot-rolled coils 302 that are already stored in the coil yard 301, that is to say, the hot-rolled coil 302 with the lowest temperature as a result of dissipating heat for the longest period is successively exported through the export conveying port (not shown). Consequently when a hot-rolled coil 302 having a large heat retention amount is newly imported into the building 303 of the coil yard 301, the water supply valve 312, of those water supply valves 312 provided for each of the water spraying nozzles 308, that corresponds to the water spraying nozzle 308 positioned above the newly imported hot-rolled coil 302 is opened, and a spray of water may be commenced onto the hot-rolled coil 302 having a large heat retention amount that has been newly imported into the building 303.

On the other hand, the water supply valve 312 that corresponds to the water spraying nozzle 308 positioned above the hot-rolled coil 302, of the hot-rolled coils 302 that are already stored in the coil yard 301, with a temperature that has fallen to a level at which the sprayed water 311 cannot be sufficiently evaporated is closed.

When operational personnel enter the building 303 of the coil yard 301 to convey the hot-rolled coils 302 or the like, the spraying of water 311 from the water spraying nozzles 308 may be stopped.

Figure 17:
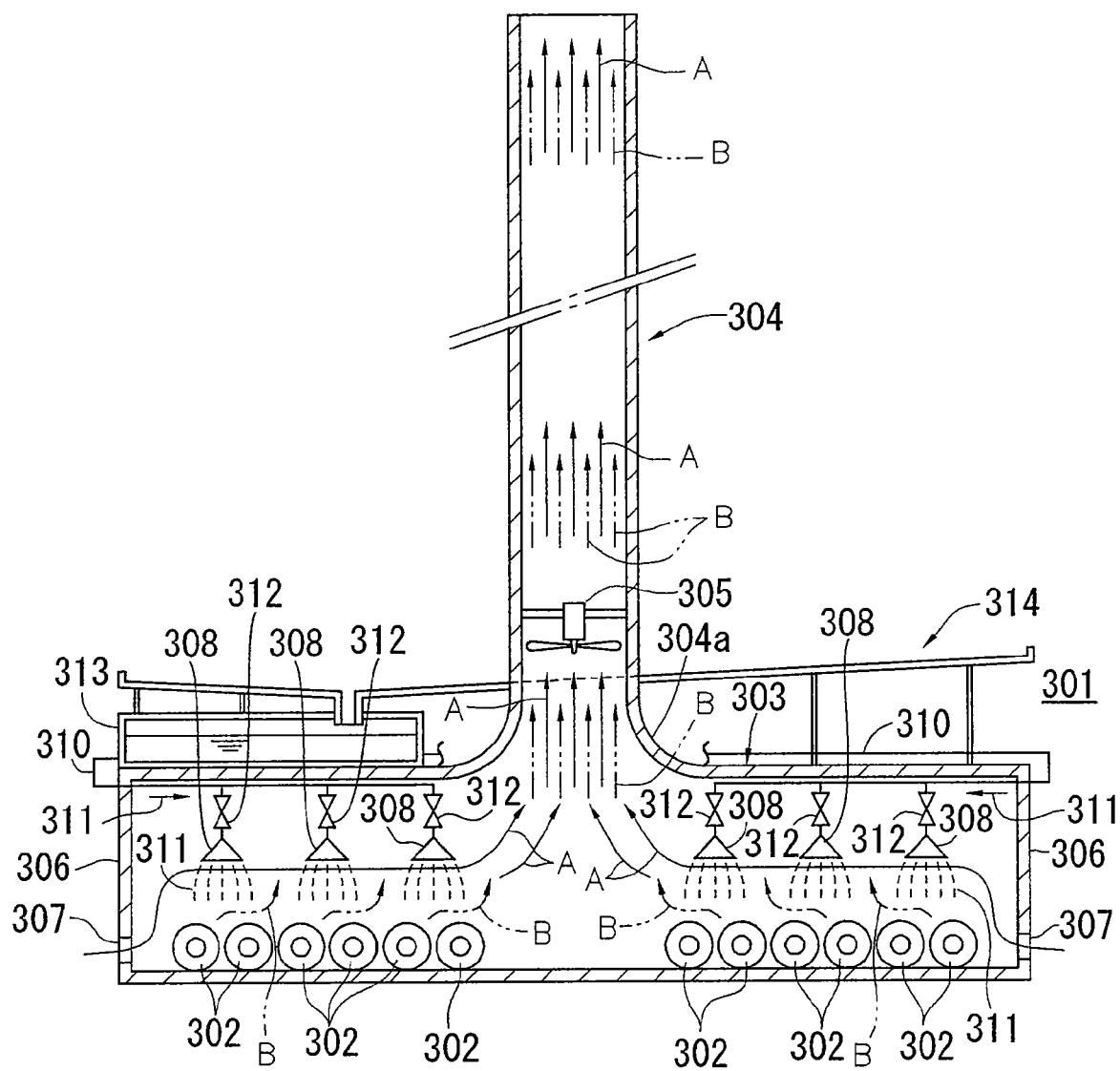
FIG. 17 is a schematic sectional side view showing a modified example of the apparatus shown in FIG. 16 as yet a further embodiment of the present invention.

FIG. 17 shows a modified example of the apparatus shown in FIG. 16 as yet a further embodiment of the present invention. In this example, in a modification of the configuration shown in FIG. 16, instead of connecting a water supply pump 309 upstream of the water supply line 310 to the respective water spraying nozzles 308 which are disposed on the ceiling portion in the building 303 of the coil yard 301, a rainwater tank 313 is provided at a higher position than the position at which the respective water spraying nozzles 308 are disposed on the ceiling portion in the building 303, for example, on an upper side of the roof of the building 303 and feeds water 311 into the water supply line 310. Furthermore a rainwater recovery mechanism 314 for recovering water falling onto the building 303 is mounted to feed water into the rainwater tank 313.

To the extent that the rainwater tank 313 is disposed in a higher position than the respective water spraying nozzles 308 provided on the ceiling portion in the building 303 of the coil yard 301, the tank may be provided at a position other than the roof of the building 303 of the coil yard 301. Furthermore rainwater from the rainwater recovery mechanism 314 provided on a structural element higher than the building 303 of the coil yard 301 (not shown) may be recovered into the rainwater tank 313 by gravity feeding. Even in the event that there is no rainwater in the rainwater tank 313 due to lack of rainfall, a water supply means such as running water or the like may be provided to the rainwater tank 313 to continue the supply of water 311 to the respective water spraying nozzles 308.

Other aspects of the configuration are the same as those shown in FIG. 16 and the same reference numerals are assigned to the same members.

According to the present embodiment, in addition to the fact that the same effect as the embodiment shown in FIG. 16 is obtained, rainwater in the rainwater tank 313 can be supplied by gravity-feed energy as the water 311 for spraying to each water spraying nozzle 308 provided on the ceiling portion of the building 303. In this manner, the energy required to supply water to each water spraying nozzle 308 can be reduced and therefore a reduction is enabled in the energy consumed in recovering as energy the heat retained in the hot-rolled coils 302 stored in the coil yard 301.

Furthermore the present invention is not limited to only the above embodiments, and to the extent that the power generating turbine 305 is driven by an ascending airflow passing through an inner portion of the discharge tower 304, the position and height of disposition of the power generating turbine 305 in the discharge tower 304 can be suitably varied.

In each of the above embodiments, an example is shown in which the water spraying nozzles 308 are provided across the entire surface of the ceiling portion of the building 303 of the coil yard 301 and switching between spraying or stopping spraying of water 311 from each water spraying nozzle 308 is enabled by the water supply valve 312 provided in each water spraying nozzle 308. However one water supply valve 312 may be provided for each of a plurality of water spraying nozzles 308 provided within a certain range in the building 303, and switching between spraying and stopping spraying of water 311 from the plurality of water spraying nozzles 308 provided in a certain range in the building 303 may be enabled by operation of the water supply valve 312. Furthermore, when the position into which the newly manufactured hot-rolled coil 302 with a large heat amount is imported in the building 303 of the coil yard 301 is determined, only the water spraying nozzle 308 above the position to which the newly manufactured hot-rolled coil 302 with a large heat amount is imported into the building 303 sprays the water 212.

Inflow of external air into the building 303 from outside of the building 303 may only be allowed through each intake duct 307 provided in the side walls 306 of the building 303 of the coil yard 301, and a reverse-flow prevention damper (not shown) may be provided to prevent gas in the building 303 from escaping to outside of the building 303. In this manner, when steam is produced by spraying the water 311 from the water spraying nozzles 308 onto a group of the relatively high-temperature hot-rolled coils 302 that has been imported into the building 303, it is possible to prevent a risk of the steam escaping outside through each intake duct 307 provided in the side walls 306 of the building 303 even in the event that excess steam is produced, and therefore it is possible to introduce all the steam produced in the building 303 into the discharge tower 304.

The configuration of the embodiment above may be modified by a configuration in which a member is provided to increase the heating efficiency for air in the building 303 using heat retained in the hot-rolled coil 302 stored in the building 303. For example, a configuration may be provided in which a radiant heat-receiving panel (not shown) is provided at a position that does not interfere with the water sprayed from the water spraying nozzles 308 in an upper portion of the building 303 of the coil yard 301, or with the conveying of hot-rolled coils 302 or with stored hot-rolled coils 302 or on an inner side of the side wall 306 of the building 303 of the coil yard 301. A configuration may be provided in which a gridiron type member (not shown) to allow passage of air to a lower side of each hot-rolled coil 302 is provided on a floor portion of the building 303 of the coil yard 301 and the hot-rolled coils 302 imported into the coil yard 301 are placed on an upper side of the gridiron type member. A configuration may be provided in which an insulating member having high-temperature resistant properties is arranged to suppress dissipation of heat to the ground surface from the bottom portion of the building 303 of the coil yard 301.

All of the embodiments above describe an example of application to a coil yard for temporary storage of a hot-rolled coil 2 that is an intermediate iron and steel product that is manufactured in an integrated iron and steel mill or the like acting as a high-temperature heat radiator manufactured by introduction of heat. However application is also possible to a storage yard for an intermediate iron and steel products such as a slab yard that temporarily stores steel billet such as a slab or the like manufactured by continuous casting by introduction of heat in an integrated iron and steel mill. Furthermore to the extent that the high-temperature heat radiator storage yard is adapted for temporary accumulation and storage prior to transfer to a subsequent processing step while dissipating the heat retained in a high-temperature heat radiator manufactured by introduction of heat by various types of equipment, application is possible to any type of high-temperature heat radiating body storage yard.

Of course, various other modifications are possible within a scope that does not depart from the spirit of the invention.

The invention claimed is:

1. A high-temperature heat radiator storage yard generating apparatus comprising:
   a building with a ceiling portion and a side wall;
   a chimney having an upper portion configured into a cylindrical portion extending upwardly is disposed in the ceiling portion of the building that temporarily accumulates and stores a high-temperature heat radiator;
   a power generating turbine disposed at a predetermined position in the cylindrical portion in the chimney to thereby generate power with an ascending airflow; and
   a radiant heat-receiving panel separated by a predetermined space from facing side walls is disposed on an inner side of the side wall of the building of the high-temperature heat radiator storage yard.

2. The high-temperature heat radiator storage yard generating apparatus according to claim 1, wherein an intake duct is disposed in a lower portion of a side wall of the building of the high-temperature heat radiator storage yard.

3. The high-temperature heat radiator storage yard generating apparatus according to claim 1, wherein the radiant heat-receiving panel is disposed vertically at a predetermined position in an upper portion of the building of the high-temperature heat radiator storage yard that does not interfere with the stored high-temperature heat radiator.

4. The high-temperature heat radiating body storage yard generating apparatus according to claim 1, wherein the high-temperature heat radiator is an intermediate iron and steel product in an iron mill, and the high-temperature heat radiator storage yard is a storage yard for temporary storage of the intermediate iron and steel product.

5. The high-temperature heat radiator storage yard generating apparatus according to claim 4, wherein the intermediate iron and steel product is a hot-rolled coil manufactured by hot-rolling equipment in the iron mill, and the storage yard for temporarily storing the intermediate iron and steel product is a coil yard.

6. The high-temperature heat radiator storage yard generating apparatus according to claim 1, wherein the high-temperature heat radiator is a hot-rolled coil manufactured by hot-rolling equipment in an iron mill, and an end portion in an exporting direction of a hot-rolled coil in the building of the hot-rolling equipment communicates with and is connected to a side portion of the building of the high-temperature heat radiator storage yard that temporarily stores and accumulates the hot-rolled coil, to thereby enable air intake.

7. The high-temperature heat radiator storage yard generating apparatus according to claim 1, wherein a gridiron is disposed on a floor of the building of the high-temperature heat radiator storage yard.

8. The high-temperature heat radiator storage yard generating apparatus according to claim 1, wherein a heat insulator is disposed on a floor of the building of the high-temperature heat radiator storage yard and has high-temperature resistant properties.

9. A high-temperature heat radiator storage yard generating apparatus comprising:
a building with a side wall;
an air discharge tower that extends in a vertical direction and is separated from the building;
a connecting duct;
a power generating turbine disposed at a predetermined position on an air discharge tower or the connecting duct, air imparted with buoyancy by heating in the building is introduced into the air discharge tower through the connecting duct to thereby generate power by an airflow passing through the air discharge tower or the connecting duct;
a predetermined position of the building of the high-temperature heat radiator storage yard, the building temporarily accumulating and storing a high-temperature heat radiator, the predetermined position of the building communicating with and being connected through the connecting duct to a lower end portion of the air discharge tower; and
a radiant heat-receiving panel separated by a predetermined space from facing side walls is disposed on the inner side of the side wall of the building of the high-temperature heat radiator storage yard.

10. The high-temperature heat radiator storage yard generating apparatus according to claim 9, wherein an existing funnel for air discharge equipment is used as the air discharge tower that is separate from the building.

11. The high-temperature heat radiator storage yard generating apparatus according to claim 9, wherein the high-temperature heat radiator is a hot-rolled coil that is manufactured by hot-rolling equipment in an iron mill, the coil being an intermediate iron and steel product in the iron mill, and the building of the high-temperature heat radiator storage yard that communicates with and is connected through a connecting duct to the lower end portion of the air discharge tower, is a building of a coil yard and an end portion in an exporting direction of the hot-rolled coil in a building of the hot-rolling equipment communicates with and is connected to a side portion of the building of the coil yard, to thereby enable air intake.

12. A high-temperature heat radiator storage yard generating apparatus comprising:
a building with an upper portion, a central portion, and a peripheral wall;
an air discharge tower, that includes a lower end portion which extends vertically and is disposed on an upper side of the building of the high-temperature heat radiator storage yard, the building temporarily storing and accumulating high-temperature heat radiator, the air discharge tower communicating with and being connected to the central portion of the ceiling of the building;
a power generating turbine, disposed at a predetermined position on the air discharge tower to thereby generate power with the ascending airflow;
air ducts, that enable an inflow of air in a horizontal direction along an inner face of the building peripheral wall, are disposed at a plurality of predetermined positions on the peripheral wall of the building so that the inflow direction of air inflowing in the horizontal direction into the building through each air duct meets at either one of a clockwise or a counterclockwise air circulation direction when viewed in plan; and
a radiant heat-receiving panel disposed vertically at a predetermined position in the upper portion of the building of the high-temperature heat radiator storage yard that does not interfere with the stored high-temperature heat radiator.

13. A high-temperature heat radiator storage yard generating apparatus comprising:
a building with an upper side, a ceiling, and a side wall;
an air discharge tower;
a power generating turbine, disposed at a predetermined position on the air discharge tower to thereby generate power with an ascending airflow;
a lower end portion of the air discharge tower extends vertically and is disposed on the upper side of the building of the high-temperature heat radiator storage yard, the building temporarily storing and accumulating high-temperature heat radiator, the lower end portion of the air discharge tower communicating with and being connected to a central portion of the ceiling of the building;
a water spraying nozzle for spraying water onto the high-temperature heat radiator stored in the building is disposed at a predetermined position on the ceiling portion in the building, and is connected through a water supply line with a water pump; and
a radiant heat-receiving panel separated by a predetermined space from facing side walls is disposed on an inner side of the side wall of the building of the high-temperature heat radiator storage yard.

14. A high-temperature heat radiator storage yard generating apparatus comprising:
a building with an upper side, a ceiling, an inner portion, and side walls;
an air discharge tower;
a power generating turbine, disposed at a predetermined position on the air discharge tower to thereby generate power with an ascending airflow;
a lower end portion of the air discharge tower, which extends vertically and is disposed on the upper side of the building of the high-temperature heat radiator storage yard, the building temporarily storing and accumulating high-temperature heat radiator, the lower end portion of the air discharge tower communicating with and being connected to a predetermined position on the ceiling of the building;
a water spraying nozzle provided at a predetermined position on a ceiling portion of the inner portion of the building, and is connected through a water supply line with a rainwater tank provided at a higher position than the position at which the water spraying nozzle is disposed; and
a radiant heat-receiving panel separated by a predetermined space from facing side walls is disposed on an inner side of the side wall of the building of the high-temperature heat radiator storage yard.

15. The high-temperature heat radiator storage yard generating apparatus according to claim 13, wherein a plurality of the water spraying nozzles is disposed at a predetermined position on the ceiling portion of the inner portion of the building, and the water supply valve is disposed corresponding to each of the water spraying nozzles.

16. The high-temperature heat radiator storage yard generating apparatus according to claim 14, wherein a plurality of the water spraying nozzles is disposed at a predetermined position on the ceiling portion of the inner portion of the building, and the water supply valve is disposed corresponding to each of the water spraying nozzles.

* * * * *

UNITED STATES PATENT AND TRADEMARK OFFICE
CERTIFICATE OF CORRECTION

PATENT NO.       : 8,572,965 B2                                                                                           Page 1 of 1
APPLICATION NO.  : 12/866390
DATED            : November 5, 2013
INVENTOR(S)      : Otsuka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
Twenty-second Day of September, 2015

Michelle K. Lee
*Director of the United States Patent and Trademark Office*